(12) United States Patent
Nishio et al.

(10) Patent No.: US 12,240,942 B2
(45) Date of Patent: *Mar. 4, 2025

(54) CATIONIC CURING AGENT, METHOD FOR PRODUCING SAME AND CATIONICALLY CURABLE COMPOSITION

(71) Applicant: DEXERIALS CORPORATION, Shimotsuke (JP)

(72) Inventors: Takeshi Nishio, Tochigi (JP); Kazunobu Kamiya, Tochigi (JP)

(73) Assignee: DEXERIALS CORPORATION, Shimotsuke (JP)

(*) Notice: Subject to any disclaimer, the term of this patent is extended or adjusted under 35 U.S.C. 154(b) by 517 days.

This patent is subject to a terminal disclaimer.

(21) Appl. No.: 17/636,499

(22) PCT Filed: Aug. 18, 2020

(86) PCT No.: PCT/JP2020/031041
§ 371 (c)(1),
(2) Date: Feb. 18, 2022

(87) PCT Pub. No.: WO2021/039480
PCT Pub. Date: Mar. 4, 2021

(65) Prior Publication Data
US 2022/0298297 A1 Sep. 22, 2022

(30) Foreign Application Priority Data

Aug. 26, 2019 (JP) .................. 2019-153648
Jul. 13, 2020 (JP) .................. 2020-119865

(51) Int. Cl.
| | |
|---|---|
| *C08G 59/68* | (2006.01) |
| *C08F 4/52* | (2006.01) |
| *C08F 4/54* | (2006.01) |
| *C08G 18/62* | (2006.01) |
| *C08G 18/72* | (2006.01) |
| *C08G 18/75* | (2006.01) |
| *C08G 18/78* | (2006.01) |
| *C08G 65/18* | (2006.01) |
| *C08K 5/00* | (2006.01) |
| *C08K 5/12* | (2006.01) |

(Continued)

(52) U.S. Cl.
CPC .............. *C08G 59/685* (2013.01); *C08F 4/52* (2013.01); *C08F 4/54* (2013.01); *C08G 18/6212* (2013.01); *C08G 18/725* (2013.01); *C08G 18/758* (2013.01); *C08G 18/7843* (2013.01); *C08G 59/68* (2013.01); *C08G 65/18* (2013.01); *C08K 5/0091* (2013.01); *C08K 5/12* (2013.01); *C08K 5/5419* (2013.01); *C08L 63/00* (2013.01); *C08L 75/02* (2013.01); *C08L 75/04* (2013.01)

(58) Field of Classification Search
CPC .. C08G 59/685; C08G 18/725; C08G 18/758; C08G 18/7843; C08G 18/6212; C08G 59/68; C08G 65/18; C08K 5/12; C08K 5/0091; C08K 5/5419; C08L 63/00; C08L 75/04; C08L 75/02; C08F 4/52; C08F 4/54

See application file for complete search history.

(56) References Cited

U.S. PATENT DOCUMENTS

| | | |
|---|---|---|
| 2003/0032729 A1 | 2/2003 | Takai et al. |
| 2010/0331435 A1 | 12/2010 | Kamiya |

(Continued)

FOREIGN PATENT DOCUMENTS

| | | |
|---|---|---|
| CN | 106661201 | 5/2017 |
| CN | 109942613 | 6/2019 |

(Continued)

OTHER PUBLICATIONS

International Search Report issued Nov. 2, 2020 in PCT/JP2020/031041, with English translation, 7 pages.

(Continued)

*Primary Examiner* — Rabon A Sergent
(74) *Attorney, Agent, or Firm* — Grüneberg and Myers PLLC

(57) ABSTRACT

A cationic curing agent includes porous particles and a compound represented by General Formula (1), where the compound is held in the porous particles.

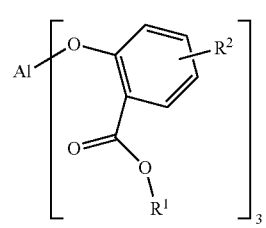

General Formula (1)

In the General Formula (1), $R^1$ is an alkyl group having 1 to 18 carbon atoms or a phenyl group, where the alkyl group may be branched and the alkyl group and the phenyl group may each further have a substituent. $R^2$ is a hydrogen atom, an alkyl group having 1 to 4 carbon atoms where the alkyl group may be branched, a halogenalkyl group, an alkoxy group, or a phenoxy group; where the alkyl group, the halogenalkyl group, the alkoxy group, or the phenoxy group may further have a substituent. $R^1$ and $R^2$ may be identical to or different from each other.

16 Claims, No Drawings

(51) Int. Cl.
  *C08K 5/5419* (2006.01)
  *C08L 63/00* (2006.01)
  *C08L 75/02* (2006.01)
  *C08L 75/04* (2006.01)

(56) References Cited

U.S. PATENT DOCUMENTS

| | | |
|---|---|---|
| 2011/0196110 A1 | 8/2011 | Kamiya |
| 2017/0253694 A1 | 9/2017 | Kamiya |
| 2019/0194454 A1* | 6/2019 | Nishio ................ C08K 5/5419 |
| 2019/0203087 A1 | 7/2019 | Kamiya |

FOREIGN PATENT DOCUMENTS

| | | |
|---|---|---|
| JP | 58-187423 | 11/1983 |
| JP | 2001-172368 | 6/2001 |
| JP | 2008-31325 | 2/2008 |
| JP | 2009-203477 | 9/2009 |
| JP | 2009-221465 | 10/2009 |
| JP | 2010-168449 | 8/2010 |
| JP | 2011-26443 | 2/2011 |
| JP | 2012-188596 | 10/2012 |
| JP | 2013-100382 | 5/2013 |
| JP | 2016-56274 | 4/2016 |
| JP | 2016-176009 | 10/2016 |
| JP | 2017-222781 | 12/2017 |
| JP | 2019-112321 | 7/2019 |
| WO | 2019/009262 | 1/2019 |

OTHER PUBLICATIONS

Written Opinion issued Nov. 2, 2020 in PCT/JP2020/031041, with English translation, 8 pages.
Chinese Office Action received for Chinese Patent Application No. 202080058415.8 mailed on Jun. 28, 2024, 18 pages with English translation.

* cited by examiner

CATIONIC CURING AGENT, METHOD FOR PRODUCING SAME AND CATIONICALLY CURABLE COMPOSITION

CROSS-REFERENCE TO RELATED APPLICATIONS

This application is the National Stage entry under § 371 of International Application No. PCT/JP2020/031041, filed on Aug. 18, 2020, and which claims the benefit of priority to Japanese Application No. 2019-153648, filed on Aug. 26, 2019, and priority to Japanese Application No. 2020-119865, filed on Jul. 13, 2020. The content of each of these applications is hereby incorporated by reference in its entirety.

TECHNICAL FIELD

The present invention relates to a cationic curing agent, a method for producing the cationic curing agent, and a cationically curable composition.

BACKGROUND ART

As a method for cationic curing of an epoxy resin, a method using an aluminium chelate compound and a silanol compound in combination as catalysts has been known. According to this method, the aluminium chelate compound and the silanol compound are reacted with each other to generate cationic curing initiation species to realize cationic curing performance.

One example of a technique associated with a latent curing agent using the above-described curing system is a method where an aluminium chelate compound is held in porous particles. For example, proposed is a method where an aluminium compound and a silanol compound are physically separated from each other by making the aluminium compound held inside porous particles produced using a polyfunctional isocyanate compound (see, for example, PTL 1).

As an example similar to the above-proposed technique, moreover, proposed is a method where a difunctional isocyanate compound is used in combination with a polyfunctional isocyanate compound to enhance curing performance (see, for example, PTL 2).

Moreover, proposed is a method where a radical polymerizable compound is further used in combination at the time when porous particles are produced (see, for example, PTL 3).

Furthermore, proposed is a method where porous inorganic particles are used as porous particles (see, for example, PTL 4).

As a method for further improving latent characteristics from the above-described methods, moreover, proposed is, for example, a method where surfaces of porous particles are treated with a certain silane treating agent (see, for example, PTL 5).

CITATION LIST

Patent Literature

PTL 1: Japanese Patent Application Laid-Open (JP-A) No. 2009-203477
PTL 2: JP-A No. 2012-188596
PTL 3: JP-A No. 2009-221465
PTL 4: JP-A No. 2013-100382
PTL 5: JP-A No. 2016-056274

SUMMARY OF INVENTION

Technical Problem

All of the above-proposed methods are methods for making an aluminium chelate compound latent and it is an assumption that cationic curing is controlled by a state of porous particles for use. There is however a problem that control of curing performance and latent characteristics by designing porous particles has a trade-off relationship because of principles of both properties.

The present invention aims to solve the above-described various problems existing in the art and to achieve the following object. Specifically, the present invention has an object to provide a cationic curing agent that can improve curing performance without impairing latent characteristics and a method for producing the cationic curing agent, and provide a cationically curable composition using the cationic curing agent.

Solution to Problem

Means for solving the above problems are as follows.

<1> A cationic curing agent including:

porous particles; and a compound represented by General Formula (1) below, the compound being held in the porous particles:

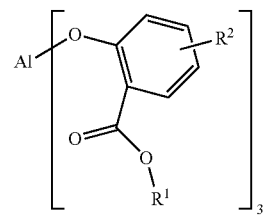

General Formula (1)

where, in the General Formula (1), $R^1$ is an alkyl group having 1 to 18 carbon atoms or a phenyl group, where the alkyl group may be branched and the alkyl group and the phenyl group may each further have a substituent, $R^2$ is a hydrogen atom, an alkyl group having 1 to 4 carbon atoms where the alkyl group may be branched, a halogenalkyl group, an alkoxy group, or a phenoxy group, where the alkyl group, the halogenalkyl group, the alkoxy group, or the phenoxy group may further have a substituent, and $R^1$ and $R^2$ may be identical to or different from each other.

<2> A cationic curing agent including:

porous particles; and a mixture of a compound represented by General Formula (1) below and a compound represented by General Formula (2) below, the mixture being held in the porous particles:

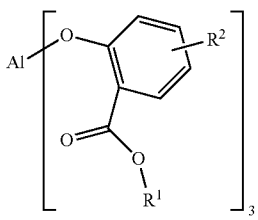

General Formula (1)

where, in the General Formula (1), $R^1$ is an alkyl group having 1 to 18 carbon atoms or a phenyl group, where the alkyl group may be branched and the alkyl group and the phenyl group may each further have a substituent, $R^2$ is a hydrogen atom, an alkyl group having 1 to 4 carbon atoms where the alkyl group may be branched, a halogenalkyl group, an alkoxy group, or a phenoxy group, where the alkyl group, the halogenalkyl group, the alkoxy group, or the phenoxy group may further have a substituent, and $R^1$ and $R^2$ may be identical to or different from each other,

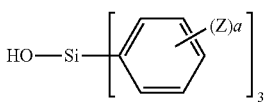

General Formula (2)

where, in the General Formula (2), Z represents a hydrogen atom or an electron attractive group, and a is an integer of 0 to 5.

<3> The cationic curing agent according to <1> or <2> above, wherein the porous particles are organic porous particles or inorganic porous particles.

<4> The cationic curing agent according to <3> above, wherein a material of the organic porous particles includes a polyurea resin.

<5> The cationic curing agent according to <4> above, wherein the material of the organic porous particles further includes a vinyl resin.

<6> The cationic curing agent according to any one of <1> to <5> above, wherein surfaces of the porous particles include a reaction product of a silane treatment agent.

<7> A method for producing a cationic curing agent, the method including allowing a compound represented by General Formula (1) below and porous particles to coexist in an organic solvent and then removing the organic solvent to hold the compound represented by General Formula (1) in the porous particles:

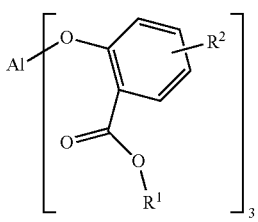

General Formula (1)

where, in the General Formula (1), $R^1$ is an alkyl group having 1 to 18 carbon atoms or a phenyl group, where the alkyl group may be branched and the alkyl group and the phenyl group may each further have a substituent, $R^2$ is a hydrogen atom, an alkyl group having 1 to 4 carbon atoms where the alkyl group may be branched, a halogenalkyl group, an alkoxy group, or a phenoxy group, where the alkyl group, the halogenalkyl group, the alkoxy group, or the phenoxy group may further have a substituent, and $R^1$ and $R^2$ may be identical to or different from each other.

<8> A method for producing a cationic curing agent, the method including allowing a compound represented by General Formula (1) below, a compound represented by General Formula (2) below, and porous particles to coexist in an organic solvent and then removing the organic solvent to hold a mixture of the compound represented by General Formula (1) and the compound represented by General Formula (2) in the porous particles:

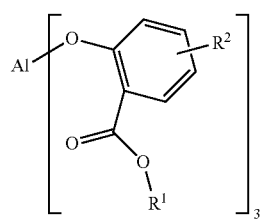

General Formula (1)

where, in the General Formula (1), $R^1$ is an alkyl group having 1 to 18 carbon atoms or a phenyl group, where the alkyl group may be branched and the alkyl group and the phenyl group may each further have a substituent.

$R^2$ is a hydrogen atom, an alkyl group having 1 to 4 carbon atoms where the alkyl group may be branched, a halogenalkyl group, an alkoxy group, or a phenoxy group, where the alkyl group, the halogenalkyl group, the alkoxy group, or the phenoxy group may further have a substituent, and $R^1$ and $R^2$ may be identical to or different from each other,

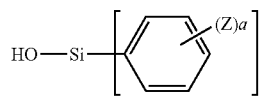

General Formula (2)

where, in the General Formula (2), Z represents a hydrogen atom or an electron attractive group, and a is an integer of 0 to 5.

<9> A cationically curable composition including:
a cationic curing component; and
the cationic curing agent according to any one of <1> to <6> above.

<10> The cationically curable composition according to <9> above, further including an organic silane compound.

<11> The cationically curable composition according to <10> above, wherein the organic silane compound is a compound represented by General Formula (2) below:

General Formula (2)

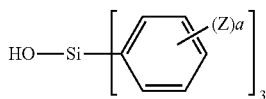

where, in the General Formula (2), Z represents a hydrogen atom or an electron attractive group, and a is an integer of 0 to 5.

Advantageous Effects of Invention

The present invention can solve the above-described various problems existing in the art and to achieve the above object, and can provide a cationic curing agent that can improve curing performance without impairing latent characteristics and a method for producing the cationic curing agent, and a cationically curable composition using the cationic curing agent.

DESCRIPTION OF EMBODIMENTS (Cationic Curing Agent)

A cationic curing agent of the present invention includes, in a first embodiment, porous particles and a compound represented by General Formula (1) below, the compound being held in the porous particles. The cationic curing agent of the first embodiment further includes other components, if necessary.

A cationic curing agent of the present invention includes, in a second embodiment, porous particles and a mixture of a compound represented by General Formula (1) below and a compound represented by General Formula (2) below, the mixture being held in the porous particles. The cationic curing agent of the second embodiment further includes other components, if necessary.

In the cationic curing agent, the compound represented by General Formula (1) or the mixture of the compound represented by General Formula (1) and the compound represented by General Formula (2) is held in the porous particles.

For example, the porous particles hold, in the pores thereof, the compound represented by General Formula (1) or the mixture of the compound represented by General Formula (1) and the compound represented by General Formula (2).

The cationic curing agent is a so-called latent curing agent.

In the cationic curing agent, the amount of the compound represented by General Formula (1) held in the porous particles or the amount of the mixture of the compound represented by General Formula (1) and the compound represented by General Formula (2) held in the porous particles is not particularly limited and may be appropriately selected depending on the intended purpose.

General Formula (1)

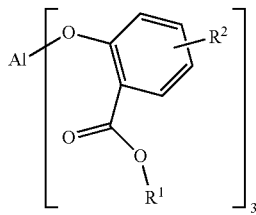

In the General Formula (1), $R^1$ is an alkyl group having 1 to 18 carbon atoms or a phenyl group, where the alkyl group may be branched and the alkyl group and the phenyl group may each further have a substituent, $R^2$ is a hydrogen atom, an alkyl group having 1 to 4 carbon atoms where the alkyl group may be branched, a halogenalkyl group, an alkoxy group, or a phenoxy group, where the alkyl group, the halogenalkyl group, the alkoxy group, or the phenoxy group may further have a substituent, and $R^1$ and $R^2$ may be identical to or different from each other.

The alkyl group having 1 to 18 carbon atoms in the $R^1$ in the General Formula (1) is not particularly limited and may be appropriately selected depending on the intended purpose, but is preferably an alkyl group having 2 to 10 carbon atoms and further preferably an alkyl group having 2 to 8 carbon atoms.

The alkyl group having 1 to 18 carbon atoms in the $R^1$ may be in the form of a straight chain or a branched chain.

A substituent in the phenyl group that may have a substituent in the $R^1$ is not particularly limited and may be appropriately selected depending on the intended purpose. Examples of the substituent include an alkyl group having 1 to 18 carbon atoms, an alkoxy group having 1 to 18 carbon atoms, and a halogen atom. Examples of the halogen atom include a fluorine atom, a chlorine atom, a bromine atom, and an iodine atom.

The alkyl group having 1 to 4 carbon atoms in the $R^2$ in the General Formula (1) is not particularly limited and may be appropriately selected depending on the intended purpose, but is preferably an alkyl group having 1 or 2 carbon atoms.

The halogenalkyl group in the $R^2$ is not particularly limited and may be appropriately selected depending on the intended purpose. Specific examples of the halogenalkyl group include a trifluoromethyl group, a trichloromethyl group, and a tribromomethyl group.

The alkoxy group in the $R^2$ is not particularly limited and may be appropriately selected depending on the intended purpose, but is preferably an alkoxy group having 1 to 10 carbon atoms, more preferably an alkoxy group having 1 to 6 carbon atoms, and particularly preferably an alkoxy group having 1 to 4 carbon atoms. The carbon atoms of the alkoxy group may be in the form of a straight chain or a branched chain.

The phenoxy group that may have a substituent in the $R^2$ is not particularly limited and may be appropriately selected depending on the intended purpose.

Examples of the substituent in the phenoxy group that may have a substituent in the $R^2$ include an alkyl group having 1 to 10 carbon atoms, a halogenated alkyl group, an alkoxy group having 1 to 10 carbon atoms, and a halogen atom.

Examples of the compound represented by General Formula (1) include tris[2-(methoxycarbonyl)-phenoxy]aluminum, tris[2-(ethoxycarbonyl)-phenoxy]aluminum, tris[2-(butoxycarbonyl)-phenoxy]aluminum, tris[2-(methoxycarbonyl)-4-methylphenoxy]aluminum, and tris[2-(methoxycarbonyl)-5-methylphenoxy]aluminum.

A method for synthesizing the compound represented by General Formula (1) is not particularly limited and may be appropriately selected depending on the intended purpose. Examples of the method include a method of allowing aluminum alkoxide and a compound for reaction to react in the presence or absence of a solvent at about room temperature (25° C.) to about 110° C. During the reaction, alcohol left from aluminum alkoxide may be distilled off.

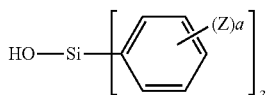

General Formula (2)

In the General Formula (2), Z represents a hydrogen atom or an electron attractive group, and a is an integer of 0 to 5.

Examples of the electron attractive group include a halogen group (e.g., a chloro group and a bromo group), a trifluoromethyl group, a nitro group, a sulfo group, a carboxyl group, an alkoxycarbonyl group (e.g., a methoxycarbonyl group and an ethoxycarbonyl group), and a formyl group.

Examples of the compound represented by General Formula (2) include triphenylsilanole, tris[(4-chloro)phenyl]silanole, tris[(4-trifluoromethyl)phenyl]silanole, tris[(3,5-ddichloro)phenyl]silanole, tris(pentafluorophenyl)silanole.

In the present invention, a mixing ratio of the compound represented by General Formula (1) and the compound represented by General Formula (2) can be appropriately selected depending on effects obtained. Relative to 100 parts by mass of the compound represented by General Formula (1), the compound represented by General Formula (2) is preferably 10 parts by mass or more but 200 parts by mass or less, and more preferably 20 parts by mass or more but 100 parts by mass or less.

When the compound represented by General Formula (1) and the compound represented by General Formula (2) are mixed in an organic solvent at the above mixing ratio, the compound represented by General Formula (1) and the compound represented by General Formula (2) may be partially reacted to form a compound represented by General Formula (3) below.

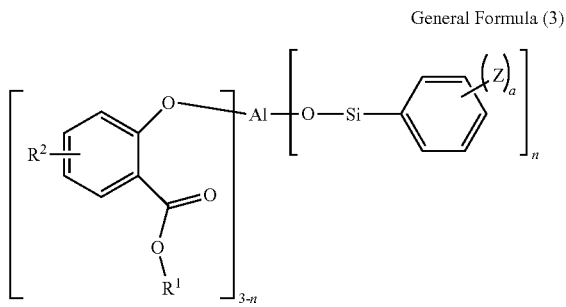

General Formula (3)

In the General Formula (3), $R^1$ and $R^2$ are the same in the meaning as $R^1$ and $R^2$ in the General Formula (1), respectively and Z and a are the same in the meaning as Z and a in the General Formula (2), respectively, and n is an integer of 1 to 3.

The mixture of the compound represented by General Formula (1) and the compound represented by General Formula (2) in the present invention includes the compound represented by General Formula (3) as well.

The compound represented by General Formula (3) is an unstable compound and decomposes by extraction. When, however, the compound represented by General Formula (3) is carried in the porous particles in the state of the mixture of the compound represented by General Formula (1) and the compound represented by General Formula (2), the compound represented by General Formula (3) can be stabilized to exist stably in the porous particles.

Whether the compound represented by General Formula (1) or the mixture of the compound represented by General Formula (1) and the compound represented by General Formula (2) is held inside of the porous particles (in the pores thereof) can be confirmed by analyzing silicon (Si) and Al in the pores through SEM/EDX of the cross sections of the porous particles.

<Porous Particles>

The porous particles are not particularly limited and may be appropriately selected depending on the intended purpose, as long as the porous particles are particles having many pores. Examples of the porous particles include porous organic resin particles formed of an organic resin and porous inorganic particles formed of an inorganic compound.

The average pore diameter of pores of the porous particles is not particularly limited and may be appropriately selected depending on the intended purpose. The average pore diameter is preferably 1 nm or more but 300 nm or less and more preferably 5 nm or more but 150 nm or less.

<<Porous Organic Resin Particles>>

The porous organic resin particles are not particularly limited and may be appropriately selected depending on the intended purpose, as long as the porous organic resin particles are porous particles formed of an organic resin.

The organic resin is not particularly limited and may be appropriately selected depending on the intended purpose. The organic resin is preferably a polyurea resin. Specifically, a material of the porous organic resin particles preferably includes a polyurea resin.

The material of the porous organic resin particles may further include a vinyl resin.

<<<Polyurea resin>>>

The polyurea resin is a resin including a urea bond in a molecule of the resin thereof.

For example, the polyurea resin constituting the porous organic resin particles can be obtained by polymerizing a polyfunctional isocyanate compound in an emulsion. The polyurea resin may include, in the resin thereof, a bond that is derived from an isocyanate group and is not a urea bond.

—Polyfunctional Isocyanate Compound—

The polyfunctional isocyanate compound is a compound including, in a molecule thereof, 2 or more isocyanate groups, preferably 3 isocyanate groups. More preferable examples of such a trifunctional isocyanate compound include: a TMP adduct represented by General Formula (4) below obtained by allowing 1 mole of trimethylol propane and 3 moles of a diisocyanate compound to react together; an isocyanurate body represented by General Formula (5) below obtained by self-condensing 3 moles of a diisocyanate compound; and a burette body represented by General Formula (6) below obtained by, among 3 moles of a diisocyanate compound, condensing 1 mole of the remained diisocynate to diisocynate urea obtained from 2 moles of the diisocyanate.

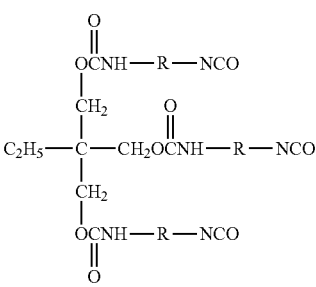

General Formula (4)

-continued

General Formula (5)

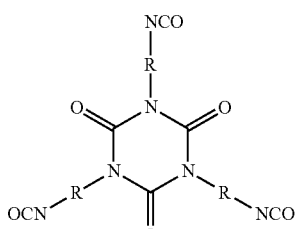

General Formula (6)

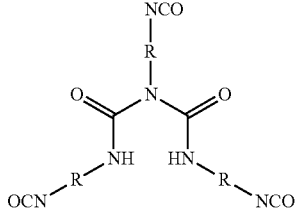

In General Formulae (4) to (6), a substituent R is a site in which isocyanate groups are removed from the diisocyanate compound. Specific examples of such a diisocyanate compound include toluene 2,4-diisocyanate, toluene 2,6-diisocyanate, m-xylene diisocyanate, hexamethylene diisocyanate, hexahydro-m-xylenediisocyanate, isophorone diisocyanate, and methylenediphenyl-4,4'-diisocyanate.

<<<Vinyl Resin>>>

The vinyl resin is a resin obtained through polymerization of a radical polymerizable vinyl compound.

The vinyl resin improves mechanical characteristics of the porous organic resin particles. Use of the vinyl resin can impart thermal response to a cationically curable composition at the time of curing, particularly, sharp thermal response in a low temperature region.

For example, the vinyl resin can be obtained by adding a radical polymerizable vinyl compound to an emulsion including a polyfunctional isocyanate compound, and performing radical polymerization of the radical polymerizable vinyl compound at the same time as when the polyfunctional isocyanate compound is polymerized in the emulsion.

—Radical Polymerizable Vinyl Compound—

The radical polymerizable vinyl compound is a compound including a radical polymerizable carbon-carbon unsaturated bond in a molecule thereof.

The radical polymerizable vinyl compound include a so-called monofunctional radical polymerizable compound and polyfunctional radical polymerizable compound.

The radical polymerizable vinyl compound preferably include a polyfunctional radical polymerizable compound. Use of the polyfunctional radical polymerizable compound easily realize sharp thermal response at a low temperature region. From the point as mentioned, the radical polymerizable vinyl compound preferably includes a polyfunctional radical polymerizable compound in an amount of 30% by mass or greater, more preferably 50% by mass or greater.

Examples of the monofunctional radical polymerizable compound include a monofunctional vinyl-based compound (e.g., styrene and methyl styrene), and a monofunctional (meth)acrylate-based compound (e.g., butyl acrylate).

Examples of the polyfunctional radical polymerizable compound include a polyfunctional vinyl-based compound (e.g., divinyl benzene, and divinyl adipate), and a polyfunctional (meth)acrylate-based compound (e.g., 1,6-hexanediol diacrylate, and trimethylol propane triacrylate).

Among these, a polyfunctional vinyl-based compound, particularly divinyl benzene, can be used in view of latent characteristics and thermal response.

Note that, a polyfunctional radical polymerizable compound may be formed from a polyfunctional vinyl-based compound and a polyfunctional (meth)acrylate-based compound. Use of the polyfunctional vinyl-based compound and the polyfunctional (meth)acrylate-based compound in combination can obtain an effect of varying thermal response or introducing a reactive functional group.

A blending amount of the radical polymerizable vinyl compound is not particularly limited and may be appropriately selected depending on the intended purpose. The blending amount thereof is preferably 1 part by mass or more but 80 parts by mass or less and more preferably 10 parts by mass or more but 60 parts by mass or less relative to 100 parts by mass of the polyfunctional isocyanate compound.

The average particle diameter of the porous organic resin particles is not particularly limited and may be appropriately selected depending on the intended purpose. The average particle diameter thereof is preferably 0.5 µm or more but µm or less, more preferably 1 µm or more but 10 µm or less, and particularly preferably 1 µm or more but 5 µm or less.

<<Porous Inorganic Particles>>

The porous inorganic particles are not particularly limited and may be appropriately selected depending on the intended purpose, as long as the porous inorganic particles are porous particles formed of an inorganic compound.

Examples of a material of the porous inorganic particles include silicon oxide, aluminium silicate, aluminium oxide, zirconium oxide, potassium oxide, calcium oxide, titanium oxide, calcium borate, sodium borosilicate, sodium oxide, and phosphoric acid salt. These may be used alone or in combination.

Examples of the porous inorganic particles include porous silica particles, porous alumina particles, porous titania particles, porous zirconia particles, and zeolite. These may be used alone or in combination.

The average particle diameter of the porous inorganic particles is not particularly limited and may be appropriately selected depending on the intended purpose. The average particle diameter thereof is preferably 50 nm or more but 5,000 µm or less, more preferably 250 nm or more but 1,000 µm or less, and particularly preferably 500 nm or more but 200 µm or less.

<<Surfaces of Porous Particles>>

The porous particles preferably include a reaction product of a silane coupling agent on surfaces thereof for the purpose of enhancing latent characteristics.

The reaction product is obtained by reacting a silane coupling agent.

The reaction product is present on surfaces of the porous particles.

It is assumed that the porous particles holding therein the compound represented by General Formula (1) or the mixture of the compound represented by General Formula (1) and the compound represented by General Formula (2) have the compound represented by General Formula (1) or the mixture of the compound represented by General Formula (1) and the compound represented by General Formula (2) on surfaces as well as inside of the porous particles because of the structure thereof.

In the case where an alicyclic epoxy resin having high reactivity is used as a cationically curable component in the below-mentioned cationically curable composition, therefore, the cationically curable composition including the cationic curing agent significantly increases viscosity over time.

Therefore, the compound represented by General Formula (1) or the mixture of the compound represented by General Formula (1) and the compound represented by General Formula (2) present on surfaces of the porous particles is preferably deactivated by a silane coupling agent, as described below.

As described below, the silane coupling agent is classified into two types.

A first type of the silane coupling agent is a silane coupling agent where an alkoxysilyl group in a molecule of the silane coupling agent is allowed to react with the active compound represented by General Formula (1) or mixture of the compound represented by General Formula (1) and the compound represented by General Formula (2) held in the porous particles to generate a polymer chain having a siloxane structure and a surface of the active compound is covered with the polymer chain to reduce the activity. Examples of the above-mentioned type of the silane coupling agent include an alkylalkoxy silane coupling agent including an alkyl group. Specific examples thereof include methyltrimethoxysilane, n-propyltrimethoxysilane, and hexyltrimethoxysilane.

A second type of the silane coupling agent is an epoxy silane coupling agent where an epoxy group in a molecule of the silane coupling agent is allowed to react with the active compound represented by General Formula (1) or mixture of the compound represented by General Formula (1) and the compound represented by General Formula (2) held in the porous particles to generate an epoxy polymer chain and a surface of the active compound is covered with the epoxy polymer chain to reduce the activity. Specific examples thereof include 2-(3,4-epoxycyclohexyl)ethyltrimethoxysilane (KBM-303, available from Shin-Etsu Chemical Co., Ltd.) and 3-glycidoxypropyltrimethoxysilane (KBM-403, available from Shin-Etsu Chemical Co., Ltd.). (Method for producing cationic curing agent) A method of the present invention for producing a cationic curing agent includes, in a first embodiment, allowing a compound represented by General Formula (1) below and porous particles to coexist in an organic solvent and then removing the organic solvent to hold the compound represented by General Formula (1) in the porous particles.

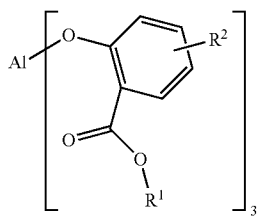

General Formula (1)

In the General Formula (1), $R^1$ is an alkyl group having 1 to 18 carbon atoms or a phenyl group, where the alkyl group may be branched and the alkyl group and the phenyl group may each further have a substituent, $R^2$ is a hydrogen atom, an alkyl group having 1 to 4 carbon atoms where the alkyl group may be branched, a halogenalkyl group, an alkoxy group, or a phenoxy group, where the alkyl group, the halogenalkyl group, the alkoxy group, or the phenoxy group may further have a substituent, and $R^1$ and $R^2$ may be identical to or different from each other.

A method of the present invention for producing a cationic curing agent includes, in a second embodiment, allowing a compound represented by General Formula (1) below, a compound represented by General Formula (2) below, and porous particles to coexist in an organic solvent and then removing the organic solvent to hold a mixture of the compound represented by General Formula (1) and the compound represented by General Formula (2) in the porous particles.

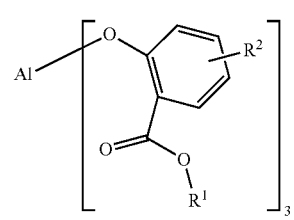

General Formula (1)

In the General Formula (1), $R^1$ is an alkyl group having 1 to 18 carbon atoms or a phenyl group, where the alkyl group may be branched and the alkyl group and the phenyl group may each further have a substituent, $R^2$ is a hydrogen atom, an alkyl group having 1 to 4 carbon atoms where the alkyl group may be branched, a halogenalkyl group, an alkoxy group, or a phenoxy group, where the alkyl group, the halogenalkyl group, the alkoxy group, or the phenoxy group may further have a substituent, and $R^1$ and $R^2$ may be identical to or different from each other.

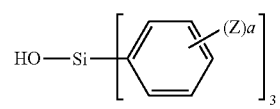

General Formula (2)

In the General Formula (2), Z represents a hydrogen atom or an electron attractive group, and a is an integer of 0 to 5.

A method for holding the compound represented by General Formula (1) or the mixture of the compound represented by General Formula (1) and the compound represented by General Formula (2) in the porous particles is preferably a method of allowing the compound represented by General Formula (1) or the compound represented by General Formula (1) and the compound represented by General Formula (2) to coexist with porous particles in an organic solvent and then removing the organic solvent.

The method of allowing the compound represented by General Formula (1) and the compound represented by General Formula (2) to coexist with porous particles in an organic solvent is preferably a method of mixing and dissolving the compound represented by General Formula (1) and the compound represented by General Formula (2) in an organic solvent in advance and then charging porous particles to the resultant. If necessary, the mixture that has been charged with the porous particles may be dispersed with a homogenizer or ultrasonic waves.

Examples of the method of removing the solvent include a method by heating, a method by reducing pressure, and a combination of these methods.

The organic solvent used is appropriately selected depending on the intended purpose but preferably has a boiling point of 150° C. or lower. Examples thereof include methanol, ethanol, isopropanol, acetone, methyl ethyl ketone, methyl acetate, ethyl acetate, toluene, xylene, acetonitrile, and tetrahydrofuran.

In order to retain flowability after distilling off the organic solvent, it is also preferable to add olefin-, ester-, or silicone-based oil or wax, which does not evaporate under conditions for distilling off the organic solvent, at the time of distilling off the organic solvent.

A method for forming a reaction product of a silane coupling agent on the surfaces of the porous particles can be performed referring to, for example, the description of JP-A No. 2016-056274.

(Cationically Curable Composition)

A cationically curable composition of the present invention includes a cationically curable component and a cationic curing agent. The cationically curable composition preferably includes an organic silane compound and if necessary, further includes other components.

<Cationically Curable Component>

The cationically curable component is not particularly limited and may be appropriately selected depending on the intended purpose, as long as the cationically curable component is an organic material that can be cured through cationic curing. Examples of the cationically curable component include an epoxy resin, an oxetane compound, and a vinyl ether resin.

<<Epoxy Resin>>

The epoxy resin is not particularly limited and may be appropriately selected depending on the intended purpose. Examples of the epoxy resin include a glycidyl ether-based epoxy resin and an alicyclic epoxy resin.

For example, the glycidyl ether-based epoxy resin may be in the state of a liquid or a solid. The epoxy equivalent of the glycidyl ether-based epoxy resin is typically about 100 to about 4,000, and the glycidyl ether-based epoxy resin preferably includes two or more epoxy groups in a molecule thereof. Examples of the glycidyl ether-based epoxy resin include a bisphenol A-based epoxy resin, a bisphenol F-based epoxy resin, a phenol novolac resin-based epoxy resin, a cresol novolac resin-based epoxy resin, and an ester-based epoxy resin. Among these, a bisphenol A-based epoxy resin is preferably used in view of resin characteristics. Moreover, these epoxy resins may include monomers and oligomers.

The alicyclic epoxy resin is not particularly limited and may be appropriately selected depending on the intended purpose. Examples of the alicyclic epoxy resin include vinyl cyclopentadiene dioxide, vinyl cyclohexhexene mono- or di-oxide, dicyclopentadiene oxide, epoxy-[epoxy-oxaspiro $C_{8-15}$ alkyl]-cyclo $C_{5-12}$ alkane (e.g., 3,4-epoxy-1-[8,9-epoxy-2,4-dioxaspiro[5.5]undecan-3-yl]-cyclohexane), 3,4-epoxycyclohexylmethyl-3',4'-epoxycyclohexane carborate, epoxy $C_{5-12}$ cycloalkyl $C_{1-3}$alkylepoxy $C_{5-12}$cycloalkane carboxyrate (e.g., 4,5-epoxycyclooctylmethyl-4',5'-epoxy-cyclooctanecarboxylate), and bis($C_{1-3}$ alkylepoxy $C_{5-12}$ cycloalkyl $C_{1-3}$ alkyl)dicaraboxylate (e.g., bis(2-methyl-3,4-epoxycyclohexylmethyl)adipate).

As the alicyclic epoxy resin, 3,4-epoxycyclohexylmethyl-3',4'-epoxycyclohexanecarboxylate [product name: CELLOXIDE #2021P, available from Daicel Corporation, epoxy equivalent: 128 to 140] is preferably used because a commercial product thereof is readily available.

Note that, in the list of the examples above, "$C_{8-15}$", "$C_{5-12}$", and "$C_{1-3}$" respectively mean having 8 to 15 carbon atoms, having 5 to 12 carbon atoms, and having 1 to 3 carbon atoms, and indicate that each of the compounds with them has a plurality of structures.

One example of the structural formula of the alicyclic epoxy resin is given below.

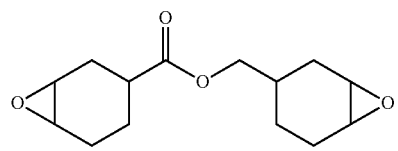 [SMILES: O=C(OCC1CCC2OC2C1)C1CCC2OC2C1]

<<Oxetane Compound>>

An exothermic peak can be made sharp by using the oxetane compound in combination with the epoxy resin in the cationically curable composition.

Examples of the oxetane compound include 3-ethyl-3-hydroxymethyloxetane, 1,4-bis{[(3-ethyl-3-oxetanyl)methoxy]methyl}benzene, 4,4'-bis[(3-ethyl-3-oxetanyl)methoxymethyl]biphenyl, 1,4-benzenedicarboxylic acid bis[(3-ethyl-3-oxetanyl)]methyl ester, 3-ethyl-3-(phenoxymethyl)oxetane, 3-ethyl-3-(2-ethylhexloxymethyDoxetane, di[1-ethyl(3-oxetanyl)]methyl ether, 3-ethyl-3-{[3-(triethoxysilyl)propoxy]methyl}oxetane, oxetanylsilsesquioxane, and phenol novolac oxetane.

An amount of the cationically curable component in the cationically curable composition is not particularly limited and may be appropriately selected depending on the intended purpose. The amount is preferably 30% by mass or more but 99% by mass or less, more preferably 50% by mass or more but 98% by mass or less, and particularly preferably 70% by mass or more but 97% by mass or less.

Note that, the amount is an amount of non-volatile components of the cationically curable composition. The same definition of the amount applies hereinafter.

<Cationic Curing Agent>

The cationic curing agent is the cationic curing agent of the present invention.

An amount of the cationic curing agent in the cationically curable composition is not particularly limited and may be appropriately selected depending on the intended purpose. The amount is preferably 1 part by mass or more but 70 parts by mass or less and more preferably 1 part by mass or more but 50 parts by mass or less relative to 100 parts by mass of the cationically curable component. When the amount is less than 1 part by mass, curing performance may be low. When the amount is more than 70 parts by mass, resin properties (e.g., flexibility) of a cured product may be poor.

<Organic Silane Compound>

As disclosed in the paragraphs [0007] to [0010] of JP-A No. 2002-212537, the organic silane compound has a function of initiating cationic polymerization of an epoxy resin with working together with aluminium chelate held in a latent curing agent.

An effect of accelerating curing of a cationically curable component can be obtained by using the cationic curing agent and the organic silane compound in combination also in the cationically curable composition.

Examples of the organic silane compound include an arylsilanol compound and a silane coupling agent.

Examples of such an organic silane compound include a highly steric hindered silanol compound and a silane coupling agent including 1 to 3 lower alkoxy groups in a molecule thereof. Note that, a group reactive to a functional group of the cationically curable component, such as a vinyl group, a styryl group, an acryloyloxy group, a methacryloyloxy group, an epoxy group, an amino group, and a mercapto group, may be included in a molecule of the silane coupling agent.

A coupling agent including an amino group or a mercapto group however can used only when the amino group or the mercapto group does not substantially capture generated cation species at the time of cationic curing.

<<Arylsilanol Compound>>

For example, the arylsilanol compound is represented by General Formula (7) below.

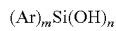 General Formula (7)

In General Formula (7), m is 2 or 3, preferably 3, the sum of m and n is 4, and Ar is an aryl group that may have a substituent.

The arylsilanol compound represented by General Formula (7) above is a mono-ol compound or a diol compound.

Ar in the General Formula (7) is an aryl group that may have a substituent.

Examples of the aryl group include a phenyl group, a naphthyl group (e.g., a 1-naphthyl group and a 2-naphthyl group), an anthracenyl group (e.g., a 1-anthracenyl group, a 2-anthracenyl group, a 9-anthracenyl group, and a benzo[a]-9-anthracenyl group), a phenanyl group (e.g., a 3-phenanyl group and a 9-phenanyl group), a pyrenyl group (e.g., a 1-pyrenyl group), an azulenyl group, a fluorenyl group, a biphenyl group (e.g., a 2-biphenyl group, a 3-biphenyl group, and a 4-biphenyl group), a thienyl group, a furyl group, a pyrrolyl group, an imidazolyl group, and a pyridyl group. Among these, a phenyl group is preferable in view of availability and cost thereof. The number "m" of "Ar"s may be all identical or different but "Ar"s are preferably all identical in view of easy availability.

These aryl groups may each have, for example, 1 to 5 substituents.

Examples of the substituent include an electron attractive group and an electron donative group.

Examples of the electron attractive group include a halogen group (e.g., a chloro group and a bromo group), a trifluoromethyl group, a nitro group, a sulfo group, a carboxyl group, an alkoxycarbonyl group (e.g., a methoxycarbonyl group and an ethoxycarbonyl group), and a formyl group.

Examples of the electron donative group include an alkyl group (e.g., a methyl group, an ethyl group, and a propyl group), an alkoxy group (e.g., a methoxy group and an ethoxy group), a hydroxyl group, an amino group, a monoalkylamino group (e.g., a monomethylamino group), and a dialkylamino group (e.g., a dimethylamino group).

Specific examples of the phenyl group having a substituent include a 2-methylphenyl group, a 3-methylphenyl group, a 4-methylphenyl group, a 2,6-dimethylphenyl group, a 3,5-dimethylphenyl group, a 2,4-dimethylphenyl group, a 2,3-dimethylphenyl group, a 2,5-dimethylphenyl group, a 3,4-dimethylphenyl group, a 2,4,6-trimethylphenyl group, a 2-ethylphenyl group, and a 4-ethylphenyl group.

Note that, use of an electron attractive group as a substituent can increase acidity of a hydroxyl group of a silanol group. Use of an electron donative group as a substituent can decrease acidity of a hydroxyl group of a silanol group. Therefore, curing performance can be controlled by a substituent.

Each of the number "m" of "Ar"s may include a different substituent, but preferably has an identical substituent in view of easy availability. Moreover, part of "Ar"s may have a substituent and the rest of "Ar"s may not have a substituent.

The arylsilanol compound is preferably the compound represented by General Formula (2) in view of accelerating cationic polymerization.

In the present invention, the compound represented by General Formula (2) held inside of the cationic curing agent and the compound represented by General Formula (2) used in the cationically curable composition may be identical or different.

<<Silane Coupling Agent>>

The silane coupling agent is a compound including 1 to 3 lower alkoxy groups in a molecule thereof. The silane coupling agent may include, in a molecule thereof, a group reactive to a functional group of a thermoset resin, such as a vinyl group, a styryl group, an acryloyloxy group, a methacryloyloxy group, an epoxy group, an amino group, and a mercapto group. Note that, a coupling agent including an amino group or a mercapto group can be used when the amino group or mercapto group does not substantially trap cationic species generated because the latent curing agent for use in the present invention is a cationic curing agent.

Examples of the silane coupling agent include vinyltris (β-methoxyethoxy)silane, vinyltriethoxysilane, vinyltrimethoxysilane, γ-styryltrimethoxysilane, γ-methacryloxypropyltrimethoxysilane, γ-acryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

An amount of the organic silane compound in the cationically curable composition is not particularly limited and may be appropriately selected depending on the intended purpose. The amount is preferably 50 parts by mass or more but 500 parts by mass or less and more preferably 100 parts by mass or more but 300 parts by mass or less relative to 100 parts by mass of the cationic curing agent.

EXAMPLES

The present invention will be described below by way of Examples. The present invention, however, shall not be construed as being limited to the Examples.

Synthesis Example 1

<Synthesis of Compound 1>

In a state where $N_2$ was introduced into a 200 mL three-necked flask equipped with a stirrer, a thermometer, and a nitrogen-introducing tube, 5.0 g (20.3 mmol) of aluminum-sec-butoxide (obtained from TOKYO CHEMICAL INDUSTRY Co., Ltd.) and 70 g of heptane were charged into the flask. While the mixture was being stirred at room temperature, 10.79 g (65.0 mmol) of ethyl salicylate (obtained from TOKYO CHEMICAL INDUSTRY Co., Ltd.) was charged thereinto, followed by heating to 100° C. to perform reaction for 2 hours. Crystals started to precipitate immediately after the reaction.

After completion of the reaction, the reaction mixture was filtrated under reduced pressure to recover the crystals. The crystals were washed with heptane, followed by drying at room temperature under reduced pressure for 24 hours, to obtain 9.75 g of Compound 1 of the following structural formula, as pale red crystals.

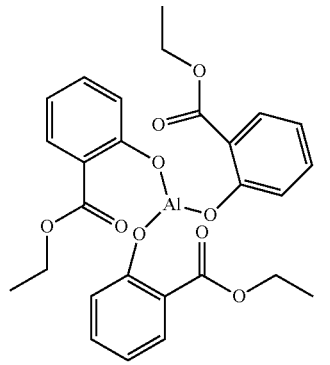

Compound 1

Synthesis Example 2

<Synthesis of Compound 2>

In the same manner as in Synthesis Example 1 except that the ethyl salicylate was changed to 11.71 g of n-propyl salicylate (obtained from TOKYO CHEMICAL INDUSTRY Co., Ltd.), 8.82 g of Compound 2 of the following structural formula was obtained as pale red crystals.

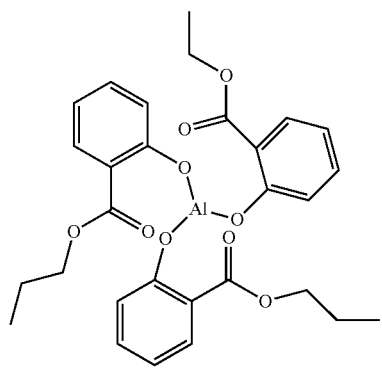

Compound 2

Synthesis Example 3

<Synthesis of Compound 3>

In the same manner as in Synthesis Example 1 except that the ethyl salicylate was changed to 12.62 g of n-butyl salicylate (obtained from TOKYO CHEMICAL INDUSTRY Co., Ltd.), 10.10 g of Compound 3 of the following structural formula was obtained as pale red crystals.

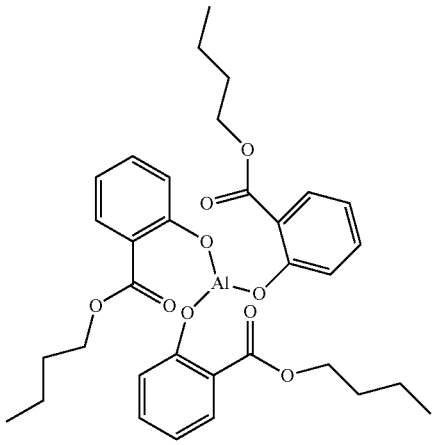

Compound 3

Synthesis Example 4

<Synthesis of Compound 4>

In the same manner as in Synthesis Example 1 except that the ethyl salicylate was changed to 10.79 g of methyl 5-methylsalicylate (obtained from TOKYO CHEMICAL INDUSTRY Co., Ltd.), 8.53 g of Compound 4 of the following structural formula was obtained as pale red crystals.

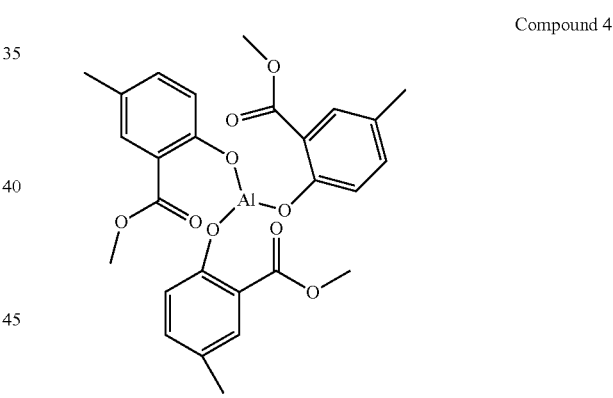

Compound 4

(Production Example 1 of Porous Particles)

<Formation of Porous Particles A>

800 parts by mass of distilled water, 0.05 parts by mass of a surfactant (NEWREX R-T, obtained from NOF CORPORATION), and 4 parts by mass of polyvinyl alcohol as a dispersant (PVA-205, obtained from KURARAY CO., LTD.) were added to a 3 L-interfacial polymerization container equipped with a thermometer, followed by homogeneously mixing. To the mixture was further added an oil phase solution, which had been prepared by dissolving the following in parts by mass of ethyl acetate: 11 parts by mass of a 24% by mass isopropanol solution of aluminum monoacetylacetonate bis(ethyl acetoacetate) (Aluminum Chelate D, obtained from Kawaken Fine Chemicals Co., Ltd.); and 11 parts by mass of trimethylolpropane (1 mol) adduct of methylenediphenyl-4,4'-diisocyanate (3 mol) (D-109, obtained from MITSUI TAKEDA CHEMICALS, INC.). The resultant mixture was mixed for emulsification with a homogenizer (11,000 rpm/10 min), followed by interfacial polymerization at 60° C. overnight.

After completion of reaction, the polymerization reaction liquid was left to stand for cooling to room temperature. The interfacial-polymerized particles were separated through filtration and dried at room temperature under reduced pressure for 24 hours, to obtain spherical particles having an average particle diameter of 10.0 μm.

Moreover, the above particles were washed with methyl ethyl ketone, followed by filtration under reduced pressure, to obtain a wet cake of porous particles A.

(Production Example 2 of Porous Particles)
<Formation of Porous Particles B>

800 parts by mass of distilled water, 0.05 parts by mass of a surfactant (NEWREX R-T, obtained from NOF CORPORATION), and 4 parts by mass of polyvinyl alcohol as a dispersant (PVA-205, obtained from KURARAY CO., LTD.) were added to a 3 L-interfacial polymerization container equipped with a thermometer, followed by homogeneously mixing, to prepare an aqueous phase.

To the aqueous phase was further added an oil phase, which had been prepared by dissolving the following in 100 parts by mass of ethyl acetate: 100 parts by mass of a 24% by mass isopropanol solution of aluminum monoacetylacetonate bis(ethyl acetoacetate) (Aluminum Chelate D, obtained from Kawaken Fine Chemicals Co., Ltd.); 70 parts by mass of trimethylolpropane (1 mol) adduct of methylenediphenyl-4,4'-diisocyanate (3 mol) as a polyfunctional isocyanate compound (D-109, obtained from MITSUI TAKEDA CHEMICALS, INC.); 30 parts by mass of divinylbenzene as a radical polymerizable compound (obtained from Merck Co., Ltd.); and a radical polymerization initiator (PEROYL L, obtained from NOF CORPORATION) in an amount (0.3 parts by mass) corresponding to 1% by mass of the radical polymerizable compound. The resultant mixture was mixed for emulsification with a homogenizer (10,000 rpm/5 min, T-50, obtained from IKA Japan, K.K.), followed by interfacial polymerization and radical polymerization at 80° C. for 6 hours. After completion of reaction, the polymerization reaction liquid was left to stand for cooling to room temperature. The polymerized particles were separated through filtration and dried at room temperature under reduced pressure for 24 hours, to obtain spherical particles having an average particle diameter of 2.9 μm.

Moreover, the above particles were washed with methyl ethyl ketone, followed by filtration under reduced pressure, to obtain a wet cake of porous particles B.

(Production Example 3 of Porous Particles)
<Formation of Porous Particles C>

800 parts by mass of distilled water, 0.05 parts by mass of a surfactant (NEWREX R-T, obtained from NOF CORPORATION), and 4 parts by mass of polyvinyl alcohol as a dispersant (PVA-205, obtained from KURARAY CO., LTD.) were added to a 3 L-interfacial polymerization container equipped with a thermometer, followed by homogeneously mixing, to prepare an aqueous phase.

To the aqueous phase was further added an oil phase, which had been prepared by dissolving the following in 100 parts by mass of ethyl acetate: 100 parts by mass of a 24% by mass isopropanol solution of aluminum monoacetylacetonate bis(ethyl acetoacetate) (Aluminum Chelate D, obtained from Kawaken Fine Chemicals Co., Ltd.); 70 parts by mass of trimethylolpropane (1 mol) adduct of methylenediphenyl-4,4'-diisocyanate (3 mol) as a polyfunctional isocyanate compound (D-109, obtained from MITSUI TAKEDA CHEMICALS, INC.); 30 parts by mass of 1,6-hexanediol diacrylate as a radical polymerizable compound; and a radical polymerization initiator (PEROYL L, obtained from NOF CORPORATION) in an amount (0.3 parts by mass) corresponding to 1% by mass of the radical polymerizable compound. The resultant mixture was mixed for emulsification with a homogenizer (10,000 rpm/5 min, T-50, obtained from IKA Japan, K.K.), followed by interfacial polymerization and radical polymerization at 80° C. for 6 hours. After completion of reaction, the polymerization reaction liquid was left to stand for cooling to room temperature. The polymerized particles were separated through filtration and dried at room temperature under reduced pressure for 24 hours, to obtain spherical particles having an average particle diameter of 2.7 μm.

Moreover, the above particles were washed with methyl ethyl ketone, followed by filtration under reduced pressure, to obtain a wet cake of porous particles C.

(Production Example 4 of Porous Particles)
<Formation of Porous Particles D>

800 parts by mass of water, 0.05 parts by mass of a surfactant (NEWREX R, obtained from NOF CORPORATION), and 4 parts by mass of polyvinyl alcohol (degree of polymerization: about 500) (obtained from Wako Pure Chemical Industries, Ltd.) were homogeneously mixed to prepare an aqueous phase. Separately, 11 parts by mass of aluminum bisethyl acetoacetate-monoacetyl acetonate (product name: Aluminum Chelate D, obtained from Kawaken Fine Chemicals Co., Ltd.), 8.8 parts by mass of an adduct of meta-xylylene diisocyanate and trimethylolpropane (product name: TAKENATE D-110N, obtained from MITSUI CHEMICALS, INC.), 2.2 parts by mass of 1,3-bis(isocyanatomethyl)cyclohexane (product name: TAKENATE 600, obtained from MITSUI CHEMICALS, INC.), and 30 parts by mass of ethyl acetate were homogeneously mixed to prepare an oil phase. While the aqueous phase was being stirred with a homogenizer (11,000 rpm), the oil phase was added dropwise to the aqueous phase for 5 minutes. Moreover, the mixture was stirred with a homogenizer for 10 minutes (11,000 rpm), followed by stirring at 60° C. for 12 hours to perform interfacial polymerization. After that, the reaction mixture was cooled to room temperature, and particles were separated with a centrifuge and then filtrated. The obtained particles were dried under reduced pressure for 24 hours to obtain spherical particles having an average particle diameter of 10.4 μm.

Moreover, the above particles were washed with methyl ethyl ketone, followed by filtration under reduced pressure, to obtain a wet cake of porous particles D.

Use Example 1

Porous silica (obtained from AGC Si-Tech Co. Ltd., product name: SUNSPHERE H-32) was provided as porous particles E.

Use Example 2

Triphenylsilanol (obtained from Kanto Chemical Industry Co., Ltd.) was provided as the compound represented by General Formula (2).

Use Example 3

Tris[(4-trifluoromethyl)phenyl]silanole (obtained from TOKYO CHEMICAL INDUSTRY Co., Ltd.) was provided as the compound represented by General Formula (2).

Example 1-1

<Formation of Porous Particles A-2 Holding Compound 2 Inside Thereof>

7 g, on the solid content basis, of the wet cake of porous particles A, which had been obtained in Production Example 1 of Porous Particles, was transferred to a 100 mL three-necked flask equipped with a $N_2$ introducing tube. 7.0 g of Compound 2 and 30 g of toluene were added to the flask. While $N_2$ gas was being introduced, the mixture was stirred at 50° C. for 15 minutes in an oil bath, the temperature of which then increased to 110° C. Under stirring, the toluene and the methyl ethyl ketone were distilled off to concentrate the liquid, to hold Compound 2 inside of porous particles A. After completion of concentration, the resultant was cooled and left to stand at room temperature for 24 hours, followed by charging 60 g of cyclohexane and stirring for 1 hour. After that, the mixture was filtrated under reduced pressure, and then a cycle of washing with 30 g of cyclohexane and filtration under reduced pressure was repeated four times. The residue after the filtration was dried under reduced pressure at 60° C. for 4 hours to form porous particles A-2 holding Compound 2 inside thereof.

Example 1-2

<Formation of Porous Particles A-3 Holding Compound 3 Inside Thereof>

Porous particles A-3 holding Compound 3 inside thereof were formed in the same manner as in Example 1-1 except that Compound 2 was changed to Compound 3.

Examples 2-1 to 2-4

<Formation of Porous Particles B-1 to B-4 Respectively Holding Compounds 1 to 4 Inside Thereof>

Porous particles B-1 to B-4 respectively holding Compounds 1 to 4 inside thereof were formed in the same manner as in Example 1-1 except that porous particles A were changed to porous particles B and further Compound 2 was changed to Compounds 1 to 4.

Examples 3-1 to 3-4

<Formation of Porous Particles C-1 to C-4 Respectively Holding Compounds 1 to 4 Inside Thereof>

Porous particles C-1 to C-4 respectively holding Compounds 1 to 4 inside thereof were formed in the same manner as in Example 1-1 except that porous particles A were changed to porous particles C and further Compound 2 was changed to Compounds 1 to 4.

Examples 4-1 to 4-4

<Formation of Porous Particles D-1 to D-4 Respectively Holding Compounds 1 to 4 Inside Thereof>

Porous particles D-1 to D-4 respectively holding Compounds 1 to 4 inside thereof were formed in the same manner as in Example 1-1 except that porous particles A were changed to porous particles D and further Compound 2 was changed to Compounds 1 to 4.

Example 5-1

<Formation of Porous Particles E-3 Holding Compound 3 Inside Thereof>

First, 7.0 g of porous particles E was added to a 100 mL three-necked flask and dried at 100° C. under reduced pressure for 3 hours. After cooling, the flask was placed in an oil bath and provided with a $N_2$ introducing tube and a thermometer. While $N_2$ gas was being introduced, 7.0 g of Compound 3 and 30 g of toluene were added to the flask, and the mixture was stirred at 50° C. for 15 minutes. The temperature of the oil bath was set to 110° C. Under stirring, the toluene was distilled off to concentrate the liquid, to hold Compound 3 in porous particles E. After completion of concentration, the resultant was cooled and left to stand at room temperature for 24 hours, followed by charging 60 g of cyclohexane and stirring for 1 hour. After filtration under reduced pressure, the resultant was washed with 30 g of cyclohexane, and filtrated again under reduced pressure. The residue after the filtration was dried under reduced pressure at 60° C. for 4 hours to form porous particles E-3 holding Compound 3 inside thereof.

Comparative Synthesis Example 1

<Formation of Comparative Compound 1>

100 g of a 24% by mass isopropanol solution (solid content: 76% by mass) of Aluminum Chelate D obtained from Kawaken Fine Chemicals Co., Ltd. (aluminum monoacetylacetonate bis(ethyl acetoacetate) was dried at 50° C. under reduced pressure for 24 hours. The resultant was washed with hexane and further dried under reduced pressure at room temperature, to obtain 71.4 g of a reddish-brown viscous solid of aluminum monoacetylacetonate bis(ethyl acetoacetate). This compound was referred to as Comparative Compound 1.

Comparative Example 1-1

<Formation of Porous Particles A-5 Enclosing Comparative Compound 1>

7 g, on the solid content basis, of the wet cake of porous particles A, which had been obtained in Production Example 1 of Porous Particles, was transferred to a 100 mL three-necked flask equipped with a $N_2$ introducing tube. 7.0 g of Comparative Compound 1 and 30 g of ethyl acetate were added to the flask. While $N_2$ gas was being introduced, the mixture was stirred at 50° C. for 15 minutes in an oil bath, the temperature of which was then increased to 80° C. Under stirring, the ethyl acetate was distilled off to concentrate the liquid, to hold Comparative Compound 1 inside of porous particles A. After completion of concentration, the resultant was cooled and left to stand at room temperature for 24 hours, followed by charging 60 g of cyclohexane and stirring for 1 hour. After that, the mixture was filtrated under reduced pressure, and then a cycle of washing with 30 g of cyclohexane and filtration under reduced pressure was repeated four times. The residue after the filtration was dried under reduced pressure at 30° C. for 24 hours to form porous particles A-5 holding Comparative Compound 1 inside thereof.

Comparative Examples 1-2 to 1-5

<Formation of Comparative Porous Particles B-5 to E-5>

Comparative porous particles B-5 to D-5 each holding Comparative Compound 1 inside thereof were formed in the same manner as in Comparative Example 1-1 except that porous particles A were changed to porous particles B to D. Comparative porous particles E-5 were formed in the same manner as in Example 5-1 using Comparative Compound 1.

The porous particles used and the compounds used in the above Examples are listed in Table 1. The porous particles used and the compounds used in the above Comparative Examples 1-1 to 1-5 are listed in Table 2.

TABLE 1

| | Examples | | | | | | | | | | | | | | |
|---|---|---|---|---|---|---|---|---|---|---|---|---|---|---|---|
| | 1-1 | 1-2 | 2-1 | 2-2 | 2-3 | 2-4 | 3-1 | 3-2 | 3-3 | 3-4 | 4-1 | 4-2 | 4-3 | 4-4 | 5-1 |
| Porous particles obtained | A-2 | A-3 | B-1 | B-2 | B-3 | B-4 | C-1 | C-2 | C-3 | C-4 | D-1 | D-2 | D-3 | D-4 | E-3 |
| Compounds used | 2 | 3 | 1 | 2 | 3 | 4 | 1 | 2 | 3 | 4 | 1 | 2 | 3 | 4 | 3 |
| Porous particles used | A | A | B | B | B | B | C | C | C | C | D | D | D | D | E |

TABLE 2

| | Comparative Examples | | | | |
|---|---|---|---|---|---|
| | 1-1 | 1-2 | 1-3 | 1-4 | 1-5 |
| Porous particles obtained | A-5 | B-5 | C-5 | D-5 | E-5 |
| Compounds used | Comparative Compond 1 | Comparative Compond 1 | Comparative Compond 1 | Comparative Compond 1 | Comparative Compond 1 |
| Porous particles used | A | B | C | D | E |

Examples 6-1 to 6-15 and Comparative Examples 2-1 to 2-5

<Preparation of Cationically Curable Compositions>

100 parts by mass of YL980 (obtained from Mitsubishi Chemical Corporation, bisphenol A type epoxy resin), 5 parts by mass of triphenylsilanol (obtained from Kanto Chemical Industry Co., Ltd.), and 2 parts by mass of each of the porous particles formed in the Examples and the Comparative Examples were blended to prepare cationically curable compositions.

The porous particles used in each of the Examples are listed in Table 3. The porous particles used in each of the Comparative Examples are listed in Table 4.

TABLE 3

| | Examples | | | | | | | | | | | | | | |
|---|---|---|---|---|---|---|---|---|---|---|---|---|---|---|---|
| | 6-1 | 6-2 | 6-3 | 6-4 | 6-5 | 6-6 | 6-7 | 6-8 | 6-9 | 6-10 | 6-11 | 6-12 | 6-13 | 6-14 | 6-15 |
| Porous particles used | A-2 | A-3 | B-1 | B-2 | B-3 | B-4 | C-1 | C-2 | C-3 | C-4 | D-1 | D-2 | D-3 | D-4 | E-3 |

TABLE 4

|  | Comparative Examples | | | | |
|---|---|---|---|---|---|
|  | 2-1 | 2-2 | 2-3 | 2-4 | 2-5 |
| Porous particles used | A-5 | B-5 | C-5 | D-5 | E-5 |

Comparative Examples 2-6 to 2-10

<Preparation of Cationically Curable Compositions>

Cationically curable compositions were prepared in the same manner as in Examples 6-1 to 6-15 and Comparative Examples 2-1 to 2-5 except that the porous particles were changed to 2 parts by mass of each of Compounds 1 to 4 and Comparative Compound 1.

The compounds used in the Comparative Examples are listed in Table 5.

TABLE 5

|  | Comparative Examples | | | | |
|---|---|---|---|---|---|
|  | 2-6 | 2-7 | 2-8 | 2-9 | 2-10 |
| Compounds used | 1 | 2 | 3 | 4 | Comparative Compound 1 |

<Evaluation of Cationic Curing Performance>

Each (5 mg) of the cationically curable compositions prepared in Examples 6-1 to 6-15 and Comparative Examples 2-1 to 2-10 was placed in an aluminum container having a diameter of 5 mm for DSC6200, followed by performing differential scanning calorimetry. The exothermic peak temperature of the DSC measurement was evaluated.

As well known in the art, cationic curing is an exothermic reaction, and an exothermic peak temperature obtained in differential scanning calorimetry reflects curing performance of cationic curing and the lower exothermic peak temperature is more desirable.

The conditions for the differential scanning calorimetry are as follows.

[Measuring Conditions]
Heating rate: 10° C./min (25° C. to 300° C.)
$N_2$ gas: 100 mL/min <Evaluation of Storage Stability of Cationically Curable Compositions>

Each of the cationically curable compositions prepared in Examples 6-1 to 6-15 and Comparative Examples 2-1 to 2-10 was stored in a sealed container for 1 day (24 hours) at 25° C., and the reaction rate during the storage was estimated by comparing the exothermic values of differential scanning calorimetry before and after the storage. The results are presented in Tables 6 and 7 together with the results of curing performance.

Note that, the reaction rate is determined by the following formula.

Reaction rate (%)=100×[(exothermic value before storage)−(exothermic value after storage)]/(exothermic value before storage)

TABLE 6

|  | Examples | | | | | | | | | | | | | | |
|---|---|---|---|---|---|---|---|---|---|---|---|---|---|---|---|
|  | 6-1 | 6-2 | 6-3 | 6-4 | 6-5 | 6-6 | 6-7 | 6-8 | 6-9 | 6-10 | 6-11 | 6-12 | 6-13 | 6-14 | 6-15 |
| Porous particles used | A-2 | A-3 | B-1 | B-2 | B-3 | B-4 | C-1 | C-2 | C-3 | C-4 | D-1 | D-2 | D-3 | D-4 | E-3 |
| Exothermic peak temp. [° C.] | 115 | 118 | 103 | 104 | 108 | 107 | 95.3 | 96.2 | 101 | 98.5 | 109 | 10 | 115 | 113 | 102 |
| Reaction rate [%] | 4.9 | 5.3 | 9.6 | 8.9 | 6.4 | 6.8 | 10.2 | 11.7 | 8.5 | 7.9 | 5.2 | 5.8 | 3.2 | 4.7 | 6.0 |

TABLE 7

|  | Comparative Examples | | | | | | | | | |
|---|---|---|---|---|---|---|---|---|---|---|
|  | 2-1 | 2-2 | 2-3 | 2-4 | 2-5 | 2-6 | 2-7 | 2-8 | 2-9 | 2-10 |
| Porous particles used | A-5 | B-5 | C-5 | D-5 | E-5 | — | — | — | — | — |
| Compounds used | — | — | — | — | — | 1 | 2 | 3 | 4 | Comp. Compd. 1 |
| Exothermic peak temp. [° C.] | 147.3 | 120.5 | 110.3 | 128 | 112.3 | 81.2 | 75.2 | 76.3 | 79.2 | 95.3 |
| Reaction rate [%] | 1.4 | 2.5 | 4.8 | 3.6 | 3.9 | 30.2 | 35.4 | 39.2 | 35.6 | 31.2 |

From the results of Tables 6 and 7, in comparison to Comparative Examples 2-6 to 2-10 in which the compound was added alone, the Examples increased in the exothermic peak temperature but improved remarkably in storage stability, suggesting that latent characteristics were secured by enclosing the compound in the porous particles.

The comparisons between the compositions containing the same porous particles (i.e., Examples 6-1 and 6-2 in comparison to Comparative Example 2-1, Examples 6-3 to 6-6 in comparison to Comparative Example 2-2, Examples 6-7 to 6-10 in comparison to Comparative Example 2-3, Examples 6-11 to 6-14 in comparison to Comparative Example 2-4, and Example 2-5 in comparison to Comparative Example 2-5) indicate that the peak temperatures in all the comparisons are lowered in the porous particles holding therein the compounds of the present invention. That is, the porous particles holding therein the compounds of the present invention (cationic curing agents) are found to improve curing performance.

Example 7-1

<Formation of Porous Particles A-2-1>

1.0 g of n-propyltrimethoxysilane (KBM-3033, obtained from Shin-Etsu Chemical Co., Ltd.) was dissolved in 9 g of cyclohexane to prepare a surface-inactivating treatment liquid. To this treatment liquid was charged 1.0 g of porous particles A-2 formed in Example 1-1. The resultant mixture was stirred at 30° C. for 20 hours. After that, the mixture was filtrated under reduced pressure while being washed with 10 g of cyclohexane, to separate the porous particles. The porous particles were dried at 40° C. under reduced pressure for 6 hours to form surface-treated porous particles A-2-1.

Examples 7-2 to 7-15

<Formation of Other Porous Particles>

Surface-treated porous particles listed in Table 8 were formed in the same manner as in Example 7-1 except that the porous particles used were changed as described in Table 8.

Comparative Examples 3-1 to 3-5

<Formation of Comparative Porous Particles>

Surface-treated porous particles listed in Table 9 were formed in the same manner as in Example 7-1 except that the porous particles used were changed as described in Table 9.

TABLE 9

| | Comparative Examples | | | | |
|---|---|---|---|---|---|
| | 3-1 | 3-2 | 3-3 | 3-4 | 3-5 |
| Porous particles formed | A-5-1 | B-5-1 | C-5-1 | D-5-1 | E-5-1 |
| Porous particles used | A-5 | B-5 | C-5 | D-5 | E-5 |

Examples 8-1 to 8-15 and Comparative Examples 4-1 to 4-5

<Preparation of Cationically Curable Compositions>

60 parts by mass of YL980 (obtained from Mitsubishi Chemical Corporation, bisphenol A type epoxy resin), 15 parts by mass of CELLOXIDE 2021P (obtained from DAICEL CORPORATION), 25 parts by mass of ARONE OXETANE OXT-221 (obtained from TOAGOSEI CO. LTD.), 5 parts by mass of triphenylsilanol (obtained from Kanto Chemical Industry Co., Ltd.), and 2 parts by mass of the porous particles formed in each of Examples 7-1 to 7-15 and Comparative Examples 3-1 to 3-5 were blended, to prepare cationically curable compositions of Examples 8-1 to 8-15 and Comparative Examples 4-1 to 4-5.

The porous particles used in each of the Examples are listed in Table 10. The porous particles used in each of the Comparative Examples are listed in Table 11.

TABLE 8

| | Examples | | | | | | | | | | | | | | |
|---|---|---|---|---|---|---|---|---|---|---|---|---|---|---|---|
| | 7-1 | 7-2 | 7-3 | 7-4 | 7-5 | 7-6 | 7-7 | 7-8 | 7-9 | 7-10 | 7-11 | 7-12 | 7-13 | 7-14 | 7-15 |
| Porous particles formed | A-2-1 | A-3-1 | B-1-1 | B-2-1 | B-3-1 | B-4-1 | C-1-1 | C-2-1 | C-3-1 | C-4-1 | D-1-1 | D-2-1 | D-3-1 | D-4-1 | E-3-1 |
| Porous particles used | A-2 | A-3 | B-1 | B--2 | B-3 | B-4 | C-1 | C-2 | C-3 | C-4 | D-1 | D-2 | D-3 | D-4 | E-3 |

TABLE 10

| | Examples | | | | | | | | | | | | | | |
|---|---|---|---|---|---|---|---|---|---|---|---|---|---|---|---|
| | 8-1 | 8-2 | 8-3 | 8-4 | 8-5 | 8-6 | 8-7 | 8-8 | 8-9 | 8-10 | 8-11 | 8-12 | 8-13 | 8-14 | 8-15 |
| Porous particles used | A-2-1 | A-3-1 | B-1-1 | B-2-1 | B-3-1 | B-4-1 | C-1-1 | C-2-1 | C-3-1 | C-4-1 | D-1-1 | D-2-1 | D-3-1 | D-4-1 | E-3-1 |

TABLE 11

| | Comparative Examples | | | | |
|---|---|---|---|---|---|
| | 4-1 | 4-2 | 4-3 | 4-4 | 4-5 |
| Porous particles used | A-5-1 | B-5-1 | C-5-1 | D-5-1 | E-5-1 |

<Evaluation of Cationic Curing Performance>

In the same manner as described above, each (5 mg) of the cationically curable compositions prepared in Examples 8-1 to 8-15 and Comparative Examples 4-1 to 4-5 was placed in an aluminum container having a diameter of 5 mm for DSC6200, followed by performing differential scanning calorimetry. The exothermic peak temperature of the DSC measurement was evaluated.

<Evaluation of Storage Stability of Cationically Curable Compositions>

Each of the cationically curable compositions prepared in Examples 8-1 to 8-15 and Comparative Examples 4-1 to 4-5 was stored in a sealed container for 1 day (24 hours) at 25° C., and the reaction rate during the storage was estimated by comparing the exothermic values of differential scanning calorimetry before and after the storage. The results are presented in Tables 12 and 13 together with the results of curing performance.

Note that, the reaction rate is determined by the following formula.

Reaction rate (%)=100×[(exothermic value before storage)−(exothermic value after storage)]/(exothermic value before storage)

TABLE 12

| | Examples | | | | | | | | | | | | | | |
|---|---|---|---|---|---|---|---|---|---|---|---|---|---|---|---|
| | 8-1 | 8-2 | 8-3 | 8-4 | 8-5 | 8-6 | 8-7 | 8-8 | 8-9 | 8-10 | 8-11 | 8-12 | 8-13 | 8-14 | 8-15 |
| Porous particles used | A-2-1 | A-3-1 | B-1-1 | B-2-1 | B-3-1 | B-4-1 | C-1-1 | C-2-1 | C-3-1 | C-4-1 | D-1-1 | D-2-1 | D-3-1 | D-4-1 | E-3-1 |
| Exothermic peak temp. [° C.] | 127 | 131 | 118 | 121 | 123 | 123 | 108 | 105 | 109 | 112 | 121 | 124 | 129 | 125 | 125 |
| Reaction rate [%] | 0.8 | 1.2 | 1.3 | 1.8 | 0.9 | 0.5 | 2.1 | 2.4 | 1.9 | 3.1 | 1.2 | 0.6 | 0.7 | 0.9 | 3.8 |

TABLE 13

| | Comparative Examples | | | | |
|---|---|---|---|---|---|
| | 4-1 | 4-2 | 4-3 | 4-4 | 4-5 |
| Porous particles used | A-5-1 | B-5-1 | C-5-1 | D-5-1 | E-5-1 |
| Exothermic peak temp. [° C.] | 153.2 | 138.5 | 130.2 | 150.8 | 135.6 |

TABLE 13-continued

| | Comparative Examples | | | | |
|---|---|---|---|---|---|
| | 4-1 | 4-2 | 4-3 | 4-4 | 4-5 |
| Reaction rate [%] | 0.4 | 1.3 | 2.1 | 0.9 | 3.4 |

From the results of Tables 12 and 13, the comparisons between the compositions containing the same porous particles (i.e., Examples 8-1 and 8-2 in comparison to Comparative Example 4-1, Examples 8-3 to 8-6 in comparison to Comparative Example 4-2, Examples 8-7 to 8-10 in comparison to Comparative Example 4-3, Examples 8-11 to 8-14 in comparison to Comparative Example 4-4, and Example 8-5 in comparison to Comparative Example 4-5) indicate that the peak temperatures in all the comparisons are lowered in the cationic curing agents of the present invention. That is, the cationic curing agents of the present invention are found to improve curing performance.

In addition, almost no difference is between the present invention and the Comparative Example in the reaction rate after storage for 1 day at 25° C., suggesting that the cationic curing agent of the present invention has increased curing performance without involving impaired storage stability. That is, the cationic curing agent of the present invention is found to improve curing performance without impairing latent characteristics.

Example 11-1

<Formation of Porous Particles AA-2 Holding a Mixture of Compound 2 and Triphenylsilanol Inside Thereof>

5.2 g of Compound 2, 5.1 g of triphenylsilanol, and 30 g of methyl ethyl ketone were added to a 100 mL three-necked flask equipped with a $N_2$ introducing tube, and the mixture was stirred in an oil bath at 50° C. for 15 minutes. After that, 7 g, on the solid content basis, of the wet cake of porous particles A, which had been obtained in Production Example 1 of Porous Particles, was charged to the flask. While $N_2$ gas was being introduced, the temperature of the oil bath was increased to 80° C. Under stirring, the methyl ethyl ketone was distilled off to concentrate the liquid, to hold a mixture of Compound 2 and triphenylsilanol inside of porous particles A. After completion of concentration, the resultant was cooled and left to stand at room temperature for 24 hours, followed by charging 60 g of cyclohexane and stirring for 1 hour. After that, the mixture was filtrated under reduced pressure, and then a cycle of washing with 30 g of cyclohexane and filtration under reduced pressure was repeated four times. The residue after the filtration was dried under reduced pressure at 60° C. for 4 hours to form porous particles AA-2 holding the mixture of Compound 2 and triphenylsilanol inside thereof.

Example 11-2

<Formation of Porous Particles AA-3 Holding a Mixture of Compound 3 and Triphenylsilanol Inside Thereof>

Porous particles AA-3 holding a mixture of Compound 3 and triphenylsilanol inside thereof were formed in the same manner as in Example 11-1 except that Compound 2 was changed to 5.5 g of Compound 3 and the amount of triphenylsilanol was changed to 5.0 g.

Examples 12-1 to 12-4

<Formation of Porous Particles BB-1 to BB-4 Each Holding a Mixture of Each of Compounds 1 to 4 and Triphenylsilanol Inside Thereof>

Porous particles BB-1 to BB-4 each holding a mixture of each of Compounds 1 to 4 and triphenylsilanol inside thereof were formed in the same manner as in Example 11-1 except that porous particles A were changed to porous particles B and further the kind of the compound and the amount of the compound charged were changed as described in Table 14-1.

TABLE 14-1

| | | Examples | | | |
|---|---|---|---|---|---|
| | | 12-1 | 12-2 | 12-3 | 12-4 |
| Compound of General Formula (1) | Kind | 1 | 2 | 3 | 4 |
| | Amount charged [g] | 5.0 | 5.2 | 5.5 | 5.0 |
| Amount of Comound of General Formula (2) (triphenylsilanol) charged [g] | | 5.3 | 5.1 | 5.0 | 5.3 |

Examples 12-5 to 12-8

<Formation of Porous Particles BB-6 to BB-9 Each Holding a Mixture of Each of Compounds 1 to 4 and Tris[(4-Trifluoromethyl)Phenyl]Silanol Inside Thereof>

Porous particles BB-6 to BB-9 each holding a mixture of each of Compounds 1 to 4 and tris[(4-trifluoromethyl)phenyl]silanol inside thereof were formed in the same manner as in Example 11-1 except that porous particles A were changed to porous particles B and further the kind of the compound and the amount of the compound charged were changed as described in Table 14-1.

TABLE 14-2

| | | Examples | | | |
|---|---|---|---|---|---|
| | | 12-5 | 12-6 | 12-7 | 12-8 |
| Compound of General Formula (1) | Kind | 1 | 2 | 3 | 4 |
| | Amount charged [g] | 5.0 | 5.0 | 5.0 | 5.0 |
| Amount of Comound of General Formula (2) tris[(4-trifluoromethyl)phenyl]silanol charged [g] | | 9.2 | 8.5 | 7.9 | 9.2 |

Examples 13-1 to 13-4

<Formation of Porous Particles CC-1 to CC-4 Each Holding a Mixture of Each of Compounds 1 to 4 and Triphenylsilanol Inside Thereof>

Porous particles CC-1 to CC-4 each holding a mixture of each of Compounds 1 to 4 and triphenylsilanol inside thereof were formed in the same manner as in Example 11-1 except that porous particles A were changed to porous particles C and further the kind of the compound and the amount of the compound charged were changed as described in Table 15.

TABLE 15

| | | Examples | | | |
|---|---|---|---|---|---|
| | | 13-1 | 13-2 | 13-3 | 13-4 |
| Compound of General Formula (1) | Kind | 1 | 2 | 3 | 4 |
| | Amount charged [g] | 5.0 | 5.2 | 5.5 | 5.0 |
| Amount of Compound of General Formula (2) (triphenylsilanol) charged [g] | | 5.3 | 5.1 | 5.0 | 5.3 |

Examples 14-1 to 14-4

<Formation of Porous Particles DD-1 to DD-4 Each Holding a Mixture of Each of Compounds 1 to 4 and Triphenylsilanol Inside Thereof>

Porous particles DD-1 to DD-4 each holding a mixture of each of Compounds 1 to 4 and triphenylsilanol inside thereof were formed in the same manner as in Example 11-1 except that porous particles A were changed to porous particles D and further the kind of the compound and the amount of the compound charged were changed as described in Table 16.

TABLE 16

| | | Examples | | | |
|---|---|---|---|---|---|
| | | 14-1 | 14-2 | 14-3 | 14-4 |
| Compound of General Formula (1) | Kind | 1 | 2 | 3 | 4 |
| | Amount charged [g] | 5.0 | 5.2 | 5.5 | 5.0 |
| Amount of Compound of General Formula (2) (triphenylsilanol) charged [g] | | 5.3 | 5.1 | 5.0 | 5.3 |

Example 15-1

<Formation of Porous Particles EE-3 Holding a Mixture of Compound 3 and Triphenylsilanol Inside Thereof>

First, 7.0 g of porous particles E was added to a 100 mL three-necked flask and dried at 100° C. under reduced pressure for 3 hours. After cooling, the flask was placed in an oil bath and provided with a $N_2$ introducing tube and a thermometer. While $N_2$ gas was being introduced, 5.5 g of Compound 3, 5.0 g of triphenylsilanol, and 30 g of ethyl acetate were added to the flask, and the mixture was stirred at 50° C. for 15 minutes. The temperature of the oil bath was set to 80° C. Under stirring, the ethyl acetate was distilled off to concentrate the liquid, to hold a mixture of Compound 3 and triphenylsilanol in porous particles E. After completion of concentration, the resultant was cooled and left to stand at room temperature for 24 hours, followed by charging 60 g of cyclohexane and stirring for 1 hour. After filtration under reduced pressure, the resultant was washed with 30 g of cyclohexane, and filtrated again under reduced pressure. The residue after the filtration was dried under reduced pressure at 60° C. for 4 hours to form porous particles EE-3 holding the mixture of Compound 3 and triphenylsilanol inside thereof.

Comparative Production Example

<Formation of Comparative Compound 1>

100 g of a 24% by mass isopropanol solution (solid content: 76% by mass) of Aluminum Chelate D obtained from Kawaken Fine Chemicals Co., Ltd. (aluminum monoacetylacetonate bis(ethyl acetoacetate) was dried at 50° C. under reduced pressure for 24 hours. The resultant was washed with hexane and further dried under reduced pressure at room temperature, to obtain 71.4 g of a reddish-brown viscous solid of aluminum monoacetylacetonate bis (ethyl acetoacetate). This compound was referred to as Comparative Compound 1.

Comparative Example 11-1

<Formation of Porous Particles AA-5 Enclosing Comparative Compound 1>

7 g, on the solid content basis, of the wet cake of porous particles A, which had been obtained in Production Example 1 of Porous Particles, was transferred to a 100 mL three-necked flask equipped with a $N_2$ introducing tube. 7.0 g of Comparative Compound 1 and 30 g of ethyl acetate were added to the flask. While $N_2$ gas was being introduced, the mixture was stirred at 50° C. for 15 minutes in an oil bath, the temperature of which was then increased to 80° C. Under stirring, the ethyl acetate was distilled off to concentrate the liquid, to hold Comparative Compound 1 inside of porous particles A After completion of concentration, the resultant was cooled and left to stand at room temperature for 24 hours, followed by charging 60 g of cyclohexane and stirring for 1 hour. After that, the mixture was filtrated under reduced pressure, and then a cycle of washing with 30 g of cyclohexane and filtration under reduced pressure was repeated four times. The residue after the filtration was dried under reduced pressure at 30° C. for 24 hours to form porous particles AA-5 holding Comparative Compound 1 inside thereof.

Comparative Examples 11-2 to 11-4

<Formation of Comparative Porous Particles BB-5 to DD-5>

Comparative porous particles BB-5 to DD-5 each holding Comparative Compound 1 inside thereof were formed in the same manner as in Comparative Example 11-1 except that porous particles A were changed to porous particles B to D.

The porous particles used and the compound used in the above Examples are listed in Tables 17-1 and 17-2. The porous particles used and the compound used in Comparative Examples 11-1 to 11-4 are listed in Table 18.

TABLE 17-1

| | Examples | | | | | | | | | |
|---|---|---|---|---|---|---|---|---|---|---|
| | 11-1 | 11-2 | 12-1 | 12-2 | 12-3 | 12-4 | 12-5 | 12-6 | 12-7 | 12-8 |
| Porous particles obtained | AA-2 | AA-3 | BB-1 | BB-2 | BB-3 | BB-4 | BB-6 | BB-7 | BB-8 | BB-9 |
| General Formula (1) compound used | 2 | 3 | 1 | 2 | 3 | 4 | 5 | 6 | 7 | 8 |
| Porous particles used | A | A | B | B | B | B | B | B | B | B |
| General Formula (2) compound used | | | Triphenylsilanol | | | | Tris[(4-trifluoromethyl)phenyl]silanol | | | |

TABLE 17-2

| | Examples | | | | | | | | |
|---|---|---|---|---|---|---|---|---|---|
| | 13-1 | 13-2 | 13-3 | 13-4 | 14-1 | 14-2 | 14-3 | 14-4 | 15-1 |
| Porous particles obtained | CC-1 | CC-2 | CC-3 | CC-4 | DD-1 | DD-2 | DD-3 | DD-4 | EE-3 |
| General Formula (1) compound used | 1 | 2 | 3 | 4 | 1 | 2 | 3 | 4 | 3 |
| Porous particles used | C | C | C | C | D | D | D | D | E |
| General Formula (2) compound used | | | | | Triphenylsilanol | | | | |

TABLE 18

| | Comparative Examples | | | |
|---|---|---|---|---|
| | 11-1 | 11-2 | 11-3 | 11-4 |
| Porous particles obtained | AA-5 | BB-5 | CC-5 | DD-5 |
| Compounds used | Comp. Compd. 1 A | Comp. Compd. 1 B | Comp. Compd. 1 C | Comp. Compd. 1 D |
| Porous particles used | | | | |

Examples 16-1 to 16-19 and Comparative Examples 12-1 to 12-4

<Preparation of Cationically Curable Compositions>

100 parts by mass of YL980 (obtained from Mitsubishi Chemical Corporation, bisphenol A type epoxy resin), 5 parts by mass of triphenylsilanol (obtained from Kanto Chemical Industry Co., Ltd.), and 2 parts by mass of each of the porous particles formed in the Examples and the Comparative Examples were blended to prepare cationically curable compositions.

The porous particles used in each of the Examples are listed in Tables 19-1 and 19-2. The porous particles used in each of the Comparative Examples are listed in Table 20.

TABLE 19-1

| | Examples | | | | | | | | | |
|---|---|---|---|---|---|---|---|---|---|---|
| | 16-1 | 16-2 | 16-3 | 16-4 | 16-5 | 16-6 | 16-7 | 16-8 | 16-9 | 16-10 |
| Porous particles used | AA-2 | AA-3 | BB-1 | BB-2 | BB-3 | BB-4 | CC-1 | CC-2 | CC-3 | CC-4 |

TABLE 19-2

| | Examples | | | | | | | | |
|---|---|---|---|---|---|---|---|---|---|
| | 16-11 | 16-12 | 16-13 | 16-14 | 16-15 | 16-16 | 16-17 | 16-18 | 16-19 |
| Porosis particles used | DD-1 | DD-2 | DD-3 | DD-4 | EE-3 | BB-6 | BB-7 | BB-8 | BB-9 |

TABLE 20

| | Comparative Examples | | | |
|---|---|---|---|---|
| | 12-1 | 12-2 | 12-3 | 12-4 |
| Porous particles used | AA-5 | BB-5 | CC-5 | DD-5 |

<Evaluation of Cationic Curing Performance>

Each (5 mg) of the cationically curable compositions prepared in Examples 16-1 to 16-19 and Comparative Examples 12-1 to 12-4 was placed in an aluminum container having a diameter of 5 mm for DSC6200, followed by performing differential scanning calorimetry. The exothermic peak temperature of the DSC measurement was evaluated.

As well known in the art, cationic curing is an exothermic reaction, and an exothermic peak temperature obtained in differential scanning calorimetry reflects curing performance of cationic curing and the lower exothermic peak temperature is more desirable.

The conditions for the differential scanning calorimetry are as follows.

[Measuring Conditions]
Heating rate: 10° C./min (25° C. to 300° C.)
$N_2$ gas: 100 mL/min <Evaluation of Storage Stability of Cationically Curable Compositions>

Each of the cationically curable compositions prepared in Examples 16-1 to 16-19 and Comparative Examples 12-1 to 12-4 was stored in a sealed container for 1 day (24 hours) at 25° C., and the reaction rate during the storage was estimated by comparing the exothermic values of differential scanning calorimetry before and after the storage. The results are presented in Tables 21-1, 21-2, and 22 together with the results of curing performance.

Note that, the reaction rate is determined by the following formula.

Reaction rate (%)=100×[(exothermic value before storage)−(exothermic value after storage)]/(exothermic value before storage)

TABLE 21-1

| | Examples | | | | | | | | | |
|---|---|---|---|---|---|---|---|---|---|---|
| | 16-1 | 16-2 | 16-3 | 16-4 | 16-5 | 16-6 | 16-7 | 16-8 | 16-9 | 16-10 |
| Porous particles used | AA-2 | AA-3 | BB-1 | BB-2 | BB-3 | BB-4 | CC-1 | CC-2 | CC-3 | CC-4 |
| Exothermic peak temp. [° C.] | 108.7 | 105.3 | 98.4 | 99.7 | 102.8 | 105.7 | 90.5 | 92.1 | 95.7 | 94.2 |
| Reaction rate [%] | 6.2 | 7.4 | 9.8 | 10.5 | 9.7 | 5.2 | 12.1 | 10.9 | 11.4 | 15.2 |

TABLE 21-2

| | Examples | | | | | | | | |
|---|---|---|---|---|---|---|---|---|---|
| | 16-11 | 16-12 | 16-13 | 16-14 | 16-15 | 16-16 | 16-17 | 16-18 | 16-19 |
| Porous particles used | DD-1 | DD-2 | DD-3 | DD-4 | EE-3 | BB-6 | BB-7 | BB-8 | BB-9 |
| Exothermic peak temp. [° C.] | 103.9 | 109.9 | 109.1 | 112.3 | 99.8 | 93.4 | 95.2 | 98.1 | 98.4 |
| Reaction rate [%] | 4.8 | 7.9 | 6.7 | 3.2 | 9.1 | 10.2 | 9.8 | 6.9 | 9.8 |

TABLE 22

| | Comparative Examples | | | |
|---|---|---|---|---|
| | 12-1 | 12-2 | 12-3 | 12-4 |
| Porous particles used | AA-5 | BB-5 | CC-5 | DD-5 |
| Exothermic peak temp. [° C.] | 147.3 | 120.5 | 110.3 | 128.2 |
| Reaction rate [%] | 1.4 | 2.5 | 4.8 | 3.6 |

From the results of Tables 21-1, 21-2, and 22, the comparisons between the compositions containing the same porous particles (i.e., Examples 16-1 and 16-2 in comparison to Comparative Example 12-1, Examples 16-3 to 16-6 in comparison to Comparative Example 12-2, Examples 16-7 to 16-10 in comparison to Comparative Example 12-3, and Examples 16-11 to 16-14 in comparison to Comparative Example 12-4) indicate that the peak temperatures in all the comparisons are lowered in the porous particles holding the compounds of the present invention. That is, the porous particles of the present invention (cationic curing agents) are found to improve curing performance. The comparisons between the particles containing different compounds of General Formula (2) (comparisons between Examples 16-3 to 16-6 and Examples 16-16 to 16-19) suggest that those using tris[(4-trifluoromethyl)phenyl]silanol, in which an electron attractive trifluoromethyl group is added to the phenyl group of triphenylsilanol, have exothermic peaks at lower temperatures and can improve curing performance.

Example 17-1

<Formation of Porous Particles AA-2-1>

1.0 g of n-propyltrimethoxysilane (KBM-3033, obtained from Shin-Etsu Chemical Co., Ltd.) was dissolved in 9 g of cyclohexane to prepare a surface-inactivating treatment liquid. To this treatment liquid was charged 1.0 g of porous particles AA-2 formed in Example 12-1. The resultant mixture was stirred at 30° C. for 20 hours. After that, the mixture was filtrated under reduced pressure while being washed with 10 g of cyclohexane, to separate the porous particles. The porous particles were dried at 40° C. under reduced pressure for 6 hours to form surface-treated porous particles AA-2-1.

Examples 17-2 to 17-19

<Formation of Other Porous Particles>

Surface-treated porous particles of Examples 17-2 to 17-19 were formed in the same manner as in Example 14-1 except that the porous particles used were changed as described in Tables 23-1 and 23-2.

Comparative Examples 13-1 to 13-4

<Formation of Comparative Porous Particles>

Surface-treated comparative porous particles of Comparative Examples 13-1 to 13-4 were formed in the same manner as in Example 17-1 except that the porous particles used were changed as described in Table 24.

TABLE 23-1

| | Examples | | | | | | | | | |
|---|---|---|---|---|---|---|---|---|---|---|
| | 17-1 | 17-2 | 17-3 | 17-4 | 17-5 | 17-6 | 17-7 | 17-8 | 17-9 | 17-10 |
| Porous particles formed | AA-2-1 | AA-3-1 | BB-1-1 | BB-2-1 | BB-3-1 | BB-4-1 | CC-1-1 | CC-2-1 | CC-3-1 | CC-4-1 |
| Porous particles used | AA-2 | AA-3 | BB-1 | BB-2 | BB-3 | BB-4 | CC-1 | CC-2 | CC-3 | CC-4 |

TABLE 23-2

| | Examples | | | | | | | | |
|---|---|---|---|---|---|---|---|---|---|
| | 17-11 | 17-12 | 17-13 | 17-14 | 17-15 | 17-16 | 17-17 | 17-18 | 17-19 |
| Porous particles formed | DD-1-1 | DD-2-1 | DD-3-1 | DD-4-1 | EE-3-1 | BB-6-1 | BB-7-1 | BB-8-1 | BB-9-1 |
| Porous particles used | DD-1 | DD-2 | DD-3 | DD-4 | EE-3 | BB-6 | BB-7 | BB-8 | BB-9 |

TABLE 24

| | Comparative Examples | | | |
|---|---|---|---|---|
| | 13-1 | 13-2 | 13-3 | 13-4 |
| Porous particles formed | AA-5-1 | BB-5-1 | CC-5-1 | DD-5-1 |
| Porous particles used | AA-5 | BB-5 | CC-5 | DD-5 |

Examples 18-1 to 18-19 and Comparative Examples 14-1 to 14-4

<Preparation of Cationically Curable Compositions>

60 parts by mass of YL980 (obtained from Mitsubishi Chemical Corporation, bisphenol A type epoxy resin), 15 parts by mass of CELLOXIDE 2021P (obtained from DAICEL CORPORATION), 25 parts by mass of ARONE OXETANE OXT-221 (obtained from TOAGOSEI CO. LTD.), 5 parts by mass of triphenylsilanol (obtained from Kanto Chemical Industry Co., Ltd.), and 2 parts by mass of the porous particles formed in each of Examples 17-1 to 17-19 and Comparative Examples 13-1 to 13-4 were blended, to prepare cationically curable compositions of Examples 18-1 to 18-19 and Comparative Examples 14-1 to 14-4.

The porous particles used in each of the Examples are listed in Tables 25-1 and 25-2. The porous particles used in each of the Comparative Examples are listed in Table 25-3.

Examples 19-1 to 19-4 and Comparative Example 15-1

<Preparation of Cationically Curable Compositions>

60 parts by mass of YL980 (obtained from Mitsubishi Chemical Corporation, bisphenol A type epoxy resin), 15 parts by mass of CELLOXIDE 2021P (obtained from DAICEL CORPORATION), 25 parts by mass of ARONE OXETANE OXT-221 (obtained from TOAGOSEI CO. LTD.), 5 parts by mass of tris[(4-trifluoromethyl)phenyl]silanole (obtained from TOKYO CHEMICAL INDUSTRY Co., Ltd.), and 2 parts by mass of the porous particles formed in each of Examples 17-3 to 17-6 and Comparative Example 13-2 were blended, to prepare cationically curable compositions of Examples 19-1 to 19-4 and Comparative Example 15-1.

The porous particles used in each of the Examples and the Comparative Example are listed in Table 26.

TABLE 25-1

| | Examples | | | | | | | | | |
|---|---|---|---|---|---|---|---|---|---|---|
| | 18-1 | 18-2 | 18-3 | 18-4 | 18-5 | 18-6 | 18-7 | 18-8 | 18-9 | 18-10 |
| Porous particles used | AA-2-1 | AA-3-1 | BB-1-1 | BB-2-1 | BB-3-1 | BB-4-1 | CC-1-1 | CC-2-1 | CC-3-1 | CC-4-1 |

TABLE 25-2

| | Examples | | | | | | | | |
|---|---|---|---|---|---|---|---|---|---|
| | 18-11 | 18-12 | 18-13 | 18-14 | 18-15 | 18-16 | 18-17 | 18-18 | 18-19 |
| Porous particles used | DD-1-1 | DD-2-1 | DD-3-1 | DD-4-1 | EE-3-1 | BB-6-1 | BB-7-1 | BB-8-1 | BB-9-1 |

TABLE 25-3

| | Comparative Examples | | | |
|---|---|---|---|---|
| | 14-1 | 14-2 | 14-3 | 14-4 |
| Porous particles used | AA-5-1 | BB-5-1 | CC-5-1 | DD-5-1 |

TABLE 26

| | Examples | | | | Comp. Ex. |
|---|---|---|---|---|---|
| | 19-1 | 19-2 | 19-3 | 19-4 | 15-1 |
| Porous particles used | BB-1-1 | BB-2-1 | BB-3-1 | BB-4-1 | BB-5-1 |

<Evaluation of Cationic Curing Performance>

In the same manner as described above, each (5 mg) of the cationically curable compositions prepared in Examples 18-1 to 18-19 and 19-1 to 19-4 and Comparative Examples 14-1 to 14-4 and 15-1 was placed in an aluminum container having a diameter of 5 mm for DSC6200, followed by performing differential scanning calorimetry. The exothermic peak temperature of the DSC measurement was evaluated.

<Evaluation of Storage Stability of Cationically Curable Compositions>

Each of the cationically curable compositions prepared in Examples 18-1 to 18-19 and 19-1 to 19-4 and Comparative Examples 14-1 to 14-4 and 15-1 was stored in a sealed container for 1 day (24 hours) at 25° C., and the reaction rate during the storage was estimated by comparing the exothermic values of differential scanning calorimetry before and after the storage. The results are presented in Tables 27-1, 27-2, 27-3, and 28 together with the results of curing performance.

Note that, the reaction rate is determined by the following formula.

Reaction rate (%)=100×[(exothermic value before storage)−(exothermic value after storage)]/(exothermic value before storage)

TABLE 27-3

| | Comparative Examples | | | |
|---|---|---|---|---|
| | 14-1 | 14-2 | 14-3 | 14-4 |
| Porous particles used | AA-5-1 | BB-5-1 | CC-5-1 | DD-5-1 |
| Exothermic peak temp. [° C.] | 153.2 | 138.5 | 130.2 | 150.8 |
| Reaction rate [%] | 0.4 | 1.3 | 2.1 | 0.9 |

TABLE 28

| | Examples | | | | Comp. Ex. |
|---|---|---|---|---|---|
| | 19-1 | 19-2 | 19-3 | 19-4 | 15-1 |
| Porous particles used | BB-1-1 | BB-2-1 | BB-3-1 | BB-4-1 | BB-5-1 |
| Exothermic peak temp. [° C.] | 105.3 | 100.2 | 108.9 | 107.8 | 130.2 |
| Reaction rate [%] | 0.8 | 2.2 | 0.5 | 2.5 | 0.9 |

From the results of Tables 27-1, 27-2, 27-3, and 28, the comparisons between the compositions containing the same porous particles (i.e., Examples 18-1 and 18-2 in comparison to Comparative Example 14-1, Examples 18-3 to 18-6 in comparison to Comparative Example 14-2, Examples 18-7 to 18-10 in comparison to Comparative Example 14-3, and Examples 18-11 to 18-14 in comparison to Comparative Example 14-4) indicate that the peak temperatures in all the comparisons are lowered in the porous particles holding therein the compounds of the present invention. That is, the cationic curing agents of the present invention are found to improve curing performance.

The comparisons between the particles containing different compounds of General Formula (2) (comparisons between Examples 18-3 to 18-6 and Examples 18-16 to 18-19) suggest that those using tris[(4-trifluoromethyl)phenyl]silanol, in which an electron attractive trifluoromethyl group is added to the phenyl group of triphenylsilanol, have exothermic peaks at lower temperatures and can improve curing performance.

TABLE 27-1

| | Examples | | | | | | | | | |
|---|---|---|---|---|---|---|---|---|---|---|
| | 18-1 | 18-2 | 18-3 | 18-4 | 18-5 | 18-6 | 18-7 | 18-8 | 18-9 | 18-10 |
| Porous particles used | AA-2-1 | AA-3-1 | BB-1-1 | BB-2-1 | BB-3-1 | BB-4-1 | CC-1-1 | CC-2-1 | CC-3-1 | CC-4-1 |
| Exothermic peak temp. [° C.] | 120.4 | 125.7 | 113.2 | 112.9 | 118.6 | 116.3 | 98.3 | 95.2 | 101.4 | 103.4 |
| Reaction rate [%] | 0.3 | 2.1 | 0.9 | 1.8 | 2.2 | 0.7 | 3.1 | 3.5 | 2.1 | 0.7 |

TABLE 27-2

| | Examples | | | | | | | | |
|---|---|---|---|---|---|---|---|---|---|
| | 18-11 | 18-12 | 18-13 | 18-14 | 18-15 | 18-16 | 18-17 | 18-18 | 18-19 |
| Porous particles used | DD-1-1 | DD-2-1 | DD-3-1 | DD-4-1 | EE-3-1 | BB-6-1 | BB-7-1 | BB-8-1 | BB-9-1 |
| Exothermic peak temp. [° C.] | 115.8 | 119.7 | 125.3 | 117.4 | 122.1 | 105.3 | 103.2 | 109.2 | 109.8 |
| Reaction rate [%] | 0.9 | 1.2 | 1.4 | 0.8 | 4.1 | 1.3 | 2.1 | 0.8 | 1.8 |

In comparison to Comparative Example 15-1, Examples 19-1 to 19-4, in which the compound of General Formula (2) contained in the cationically curable compositions was tris[(4-trifluoromethyl)phenyl]silanol, also indicate that the peak temperatures are lowered in the porous particles holding therein the compounds of the present invention. Even in comparison to Examples 18-3 to 18-6 in which triphenylsilanol was blended, the peak temperatures are lowered, suggesting that the addition of an electron attractive group to the phenyl group of triphenylsilanol allows for better curing performance.

In addition, almost no difference is between the present invention and the Comparative Example in the reaction rate after storage for 1 day at 25° C., suggesting that the porous particles of the present invention have increased curing performance without impairing storage stability. That is, the cationic curing agent of the present invention is found to improve curing performance without impairing latent characteristics. Also, this effect is found to remain unchanged even if the compound of General Formula (2) in the cationically curable composition is changed from triphenylsilanol to tris[(4-trifluoromethyl)phenyl]silanol.

INDUSTRIAL APPLICABILITY

The cationic curing agent of the present invention is suitably used as a latent curing agent of a cationically curable composition.

The cationically curable composition of the present invention is suitably used as a cationically curable composition of latent curing.

The invention claimed is:

1. A cationic curing agent, comprising:
porous particles; and
a compound represented by General Formula (1) below, the compound being held in the porous particles:

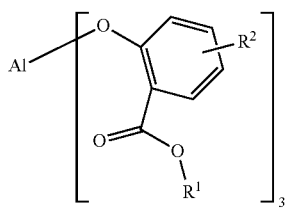

General Formula (1)

where, in the General Formula (1), $R^1$ is a linear or branched alkyl group having 1 to 18 carbon atoms with or without a substituent or a phenyl group with or without a substituent,
$R^2$ is a hydrogen atom, a linear or branched alkyl group having 1 to 4 carbon atoms with or without a substituent, a halogenalkyl group with or without a substituent an alkoxy group with or without a substituent, or a phenoxy group with or without a substituent, and
$R^1$ and $R^2$ are identical to or different from each other.

2. A cationic curing agent, comprising:
porous particles; and
a mixture of a compound represented by General Formula (1) below and a compound represented by General Formula (2) below, the mixture being held in the porous particles:

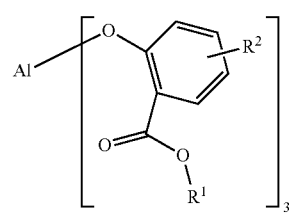

General Formula (1)

where, in the General Formula (1), $R^1$ is a linear or branched alkyl group having 1 to 18 carbon atoms with or without a substituent or a phenyl group with or without a substituent,
$R^2$ is a hydrogen atom, a linear or branched alkyl group having 1 to 4 carbon atoms with or without a substituent, a halogenalkyl group with or without a substituent, an alkoxy group with or without a substituent, or a phenoxy group with or without a substituent, and
$R^1$ and $R^2$ are identical to or different from each other,

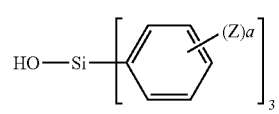

General Formula (2)

where, in the General Formula (2), Z represents a hydrogen atom or an electron attractive group, and a is an integer of 0 to 5.

3. The cationic curing agent according to claim 1, wherein the porous particles are organic porous particles or inorganic porous particles.

4. The cationic curing agent according to claim 3, wherein a material of the organic porous particles includes a polyurea resin.

5. The cationic curing agent according to claim 4, wherein the material of the organic porous particles further includes a vinyl resin.

6. The cationic curing agent according to claim 1, wherein surfaces of the porous particles include a reaction product of a silane treatment agent.

7. A method for producing a cationic curing agent, the method comprising:
allowing a compound represented by General Formula (1) below and porous particles to coexist in an organic solvent and then removing the organic solvent to hold the compound represented by General Formula (1) in the porous particles:

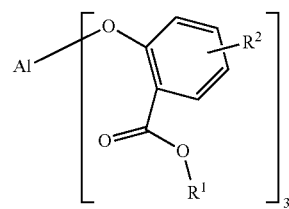

General Formula (1)

where, in the General Formula (1), $R^1$ is a linear or branched alkyl group having 1 to 18 carbon atoms with or without a substituent or a phenyl group with or without a substituent, $R^2$ is a hydrogen atom, a linear or branched alkyl group having 1 to 4 carbon atoms with or without a substituent, a halogenalkyl group with or without a substituent, an alkoxy group with or without a substituent, or a phenoxy group with or without a substituent, and $R^1$ and $R^2$ are identical to or different from each other.

8. A method for producing a cationic curing agent, the method comprising:

allowing a compound represented by General Formula (1) below, a compound represented by General Formula (2) below, and porous particles to coexist in an organic solvent and then removing the organic solvent to hold a mixture of the compound represented by General Formula (1) and the compound represented by General Formula (2) in the porous particles:

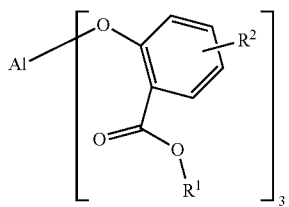

General Formula (1)

where, in the General Formula (1), $R^1$ is a linear or branched alkyl group having 1 to 18 carbon atoms with or without a substituent or a phenyl group with or without a substituent, $R^2$ is a hydrogen atom, a linear or branched alkyl group having 1 to 4 carbon atoms with or without a substituent, a halogenalkyl group with or without a substituent, an alkoxy group with or without a substituent, or a phenoxy group with or without a substituent, and $R^1$ and $R^2$ are identical to or different from each other,

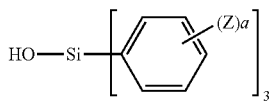

General Formula (2)

where, in the General Formula (2), Z represents a hydrogen atom or an electron attractive group, and a is an integer of 0 to 5.

9. A cationically curable composition, comprising:

a cationic curing component; and the cationic curing agent according to claim 1.

10. The cationically curable composition according to claim 9, further comprising an organic silane compound.

11. The cationically curable composition according to claim 10, wherein the organic silane compound is a compound represented by General Formula (2) below:

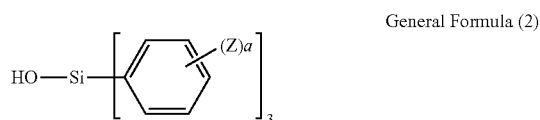

General Formula (2)

where, in the General Formula (2), Z represents a hydrogen atom or an electron attractive group, and a is an integer of 0 to 5.

12. The cationic curing agent according to claim 2, wherein the porous particles are organic porous particles or inorganic porous particles.

13. The cationic curing agent according to claim 12, wherein a material of the organic porous particles includes a polyurea resin.

14. The cationic curing agent according to claim 13, wherein the material of the organic porous particles further includes a vinyl resin.

15. The cationic curing agent according to claim 2, wherein surfaces of the porous particles include a reaction product of a silane treatment agent.

16. A cationically curable composition, comprising:

a cationic curing component; and the cationic curing agent according to claim 2.

* * * * *